United States Patent
Feng et al.

(10) Patent No.: US 10,367,647 B2
(45) Date of Patent: Jul. 30, 2019

(54) CERTIFICATE ACQUIRING METHOD AND DEVICE

(71) Applicant: Huawei Technologies Co., Ltd., Shenzhen (CN)

(72) Inventors: Chengyan Feng, Shenzhen (CN); Jiangsheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 15/345,829

(22) Filed: Nov. 8, 2016

(65) Prior Publication Data
US 2017/0054565 A1    Feb. 23, 2017

Related U.S. Application Data

(63) Continuation of application No. PCT/CN2014/077074, filed on May 8, 2014.

(51) Int. Cl.
| | |
|---|---|
| *H04L 29/06* | (2006.01) |
| *H04L 9/32* | (2006.01) |
| *H04L 9/14* | (2006.01) |
| *H04L 9/30* | (2006.01) |

(52) U.S. Cl.
CPC .............. *H04L 9/3263* (2013.01); *H04L 9/14* (2013.01); *H04L 9/30* (2013.01); *H04L 9/32* (2013.01); *H04L 63/06* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 9,100,171 B1* | 8/2015 | Peterson | H04L 9/0833 |
| 2004/0053642 A1 | 3/2004 | Sandberg et al. | |
| 2006/0200857 A1 | 9/2006 | Yokota | |
| 2008/0005791 A1 | 1/2008 | Gupta et al. | |
| 2010/0005504 A1 | 1/2010 | Gottimukkala et al. | |

(Continued)

FOREIGN PATENT DOCUMENTS

| | | |
|---|---|---|
| CN | 1961526 A | 5/2007 |
| CN | 101030908 A | 9/2007 |

(Continued)

OTHER PUBLICATIONS

Machine Translation and Abstract of Chinese Publication No. CN103023920, Apr. 3, 2013, 20 pages.

(Continued)

*Primary Examiner* — Michael R Vaughan
(74) *Attorney, Agent, or Firm* — Conley Rose, P.C.

(57) ABSTRACT

A certificate acquiring method and device, where the method includes receiving a certificate application representation message sent by a newly installed virtualized network function component (VNFC) instance, sending a certificate request message to a certification authority, and acquiring a certificate issued by the certification authority. In this way, the newly installed VNFC instance does not need to use a current manner for a virtualized network function (VNF) to acquire a certificate, which effectively avoids a problem of a cumbersome and more complex process caused when the newly installed VNFC instance acquires a certificate.

20 Claims, 7 Drawing Sheets

(56) References Cited

U.S. PATENT DOCUMENTS

| | | | |
|---|---|---|---|
| 2011/0145569 A1* | 6/2011 | Liu | H04L 63/0823 713/158 |
| 2012/0278869 A1* | 11/2012 | Guccione | H04L 63/102 726/5 |
| 2012/0331524 A1 | 12/2012 | Mower et al. | |
| 2014/0086177 A1 | 3/2014 | Adjakple et al. | |
| 2017/0012968 A1 | 1/2017 | Feng et al. | |
| 2017/0054710 A1 | 2/2017 | Xiong et al. | |

FOREIGN PATENT DOCUMENTS

| | | |
|---|---|---|
| CN | 101039182 A | 9/2007 |
| CN | 101272252 A | 9/2008 |
| CN | 103023920 A | 4/2013 |
| CN | 103475485 A | 12/2013 |
| CN | 103888429 A | 6/2014 |
| CN | 104639516 A | 5/2015 |
| EP | 2043320 A1 | 4/2009 |
| JP | 2005086445 A | 3/2005 |
| JP | 2005149337 A | 6/2005 |
| JP | 2014082584 A | 5/2014 |
| RU | 2258324 C2 | 8/2005 |
| WO | 2013097117 A1 | 7/2013 |
| WO | 2013097209 A1 | 7/2013 |
| WO | 2014057369 A1 | 4/2014 |
| WO | 2014079009 A1 | 5/2014 |

OTHER PUBLICATIONS

Machine Translation and Abstract of Chinese Publication No. CN103888429, Jun. 25, 2014, 43 pages.
Machine Translation and Abstract of Chinese Publication No. CN104639516, May 20, 2015, 35 pages.
Machine Translation and Abstract of International Publication No. WO2013097209, Jul. 4, 2013, 24 pages.
"Key Management Techniques," XP001525013, Chapter 13, 1997, 50 pages.
Foreign Communication From a Counterpart Application, European Application No. 14891512.7, Extended European Search Report dated Jan. 12, 2017, 9 pages.
Foreign Communication From a Counterpart Application, PCT Application No. PCT/CN2014/077074, English Translation of International Search Report dated Feb. 17, 2015, 2 pages.
Foreign Communication From a Counterpart Application, PCT Application No. PCT/CN2014/077074, English Translation of Written Opinion dated Feb. 17, 2015, 7 pages.
Machine Translation and Abstract of Chinese Publication No. CN103475485, Dec. 25, 2013, 16 pages.
Machine Translation and Abstract of Japanese Publication No. JP2005086445, Mar. 31, 2005, 22 pages.
Machine Translation and Abstract of Japanese Publication No. JP2005149337, Jun. 9, 2005, 35 pages.
Machine Translation and Abstract of Japanese Publication No. JP2014082584, May 8, 2014, 9 pages.
"NFV/SDN Impacts to 3GPP," 3GPP TSG-SA#63 SP-140120, Mar. 7, 2014, 21 pages.
Whole Picture of NTT Communications' Next Generation Cloud Computing Vision "Setten", Business Communication, v46, first issue, Japan, Business Communication Co., Ltd., Jan. 1, 2009, v46, 15 pages.
English Translation of Whole Picture of NTT Communications' Next Generation Cloud Computing Vision "Setten", Business Communication, v46, first issue, Japan, Business Communication Co., Ltd., Jan. 1, 2009, v46, pp. 28-41, 1 page.
Horikoshi, Isao, "Impact of NFV to Change Future of Communications," Nikkei Communication, Japan, Nikkei Business Publication Inc., Apr. 1, 2014, v603, pp. 32-33, 3 pages.
English Translation of Horikoshi, Isao, "Impact of NFV to Change Future of Communications," Nikkei Communication, Japan, Nikkei Business Publication Inc., Apr. 1, 2014, v603, pp. 32-33, 1 page.
Foreign Communication From a Counterpart Application, Japanese Application No. 2017-510713, Japanese Notice of Allowance dated Feb. 20, 2018, 3 pages.
Foreign Communication From a Counterpart Application, Russian Application No. 2016147696, Russian Decision on Grant dated Dec. 8, 2017, 9 pages.
Foreign Communication From a Counterpart Application, Russian Application No. 2016147696, English Translation of Russian Decision on Grant dated Dec. 8, 2017, 7 pages.
Foreign Communication From a Counterpart Application, Russian Application No. 2016147696, Russian Search Report dated Dec. 7, 2017, 2 pages.
Foreign Communication From a Counterpart Application, Russian Application No. 2016147696, English Translation of Russian Search Report dated Dec. 7, 2017, 2 pages.

* cited by examiner

CERTIFICATE ACQUIRING METHOD AND DEVICE

CROSS-REFERENCE TO RELATED APPLICATIONS

This application is a continuation of International Application No. PCT/CN2014/077074, filed on May 8, 2014, the disclosure of which is hereby incorporated by reference in its entirety.

TECHNICAL FIELD

The present application relates to the field of virtual network deployments, and in particular, to a certificate acquiring method and device.

BACKGROUND

Network function virtualization (NFV) is a standard organization established with an objective of "conventional network virtualization," and formulates a set of standards of network deployment in a virtualization environment. By means of the standards formulated by the NFV organization, capabilities such as network virtualization and flexible deployment can be implemented.

As a virtualized network function (VNF) ( ) is introduced to an NFV technology, a conventional communication technology network architecture and a network node architecture have a relatively great change. In a new telecommunications architecture, a conventional physical telecommunications node evolves to a virtual node in a virtual device, and exists in a form of a virtual machine. In this way, multiple conventional physical nodes are jointly deployed in a same physical host machine, to share hardware resources, and even share resources with other third-party application software, thereby increasing performance of communication between different virtual machines in a same virtual device.

For example, a conventional Internetworking Protocol (IP) network evolves to a virtual network by means of a virtual switch and a virtual network adapter, and communication is performed between different virtual machines by means of the virtual network such that a conventional physical network device is bypassed.

The virtual network is the same as a conventional network, and both communication performed between virtual machines inside the virtual network and communication performed between a virtual machine and an external network face a network security risk. For example, the virtual machines attack each other, or a host machine application performs an attack using an interconnection to a virtual machine network. Therefore, a secure connection is established between the virtual machines on the virtual network using a security technology (for example, an IP security (IPSec) technology or a transport layer security protocol (TLS) technology). In the foregoing security technology, two virtual machines that communicate with each other need to be configured with a certificate that is based on X.509, to implement mutual authentication by a communication peer end.

In a virtualized scenario, a VNF is a group of software, and is instantiated when needed. The instantiation of the VNF refers to a process of determining required virtualization resources and allocating the required virtualization resources to one piece of VNF software and installing the VNF software. The instantiated VNF is not a conventional hardware entity, and does not always exist, but is generated in a software form according to a need and exists dynamically, and a physical location at which the instantiated VNF is installed is not fixed. Therefore, a conventional entity certificate configuration method is not applicable to the virtual software, for example, the VNF.

To configure a certificate for a VNF according to a feature of the VNF, a certificate configuration manner is provided currently, that is, in a VNF instantiation process, an operator configures an initial certificate for an instantiated VNF, and installs the initial certificate on the instantiated VNF. The instantiated VNF uses the initial certificate to acquire a certificate from a certification authority (CA).

In an actual application, a virtualized network function component (VNFC) is used as a component of a VNF, and a manner for the VNFC to acquire a certificate issued by the CA is the same as a manner for the VNF to acquire a certificate. That is, when the VNF is instantiated, an initial certificate is configured for each VNFC, and the initial certificate is installed successfully after the VNFC is instantiated. Then the VNFC instance uses the initial certificate to apply for a formal certificate from the CA. After the initial certificate is introduced, a process for the VNF to acquire the certificate is relatively complex, and a private key associated with the initial certificate faces a leakage risk in a transfer process, which reduces security for the VNF to acquire the certificate.

However, in an NFV scenario, the VNF may have multiple embodiments. In a use process, to improve network performance, a new VNFC may need to be added. If the newly added VNFC needs to communicate with the outside, the newly added VNFC needs to acquire a certificate, but if the foregoing manner of using an initial certificate to acquire a formal certificate is still used, a process is cumbersome and becomes more complex, and moreover, a system reacts less quickly and runs less efficiently.

SUMMARY

In view of this, embodiments of the present application provide a certificate acquiring method and device, which are used to resolve a problem of how a newly added VNFC of a VNF acquires a certificate to improve a system reaction speed, and increase system running efficiency.

According to a first aspect of the present application, a certificate acquiring device is provided, including a receiving module configured to receive a certificate application representation message sent by a newly installed VNFC instance, where the certificate application representation message includes a public key used by the newly installed VNFC instance to apply for a certificate, a sending module configured to send a certificate request message to a CA according to the certificate application representation message received by the receiving module, to request the CA to issue a certificate to the newly installed VNFC instance, where the certificate request message includes a certificate of a master VNFC instance and the public key used by the newly installed VNFC instance to apply for a certificate, and an acquiring module configured to acquire the certificate issued by the CA, where the certificate is issued by the CA using the public key used by the newly installed VNFC instance to apply for a certificate.

With reference to the possible implementation manner of the first aspect of the present application, in a first possible implementation manner, the device further includes an authentication module, where the receiving module is further configured to receive a certificate response message sent by the CA before the acquiring module acquires the certificate issued by the CA, and the authentication module is configured to perform authentication on the certificate response message received by the receiving module.

With reference to the first possible implementation manner of the first aspect of the present application, in a second possible implementation manner, the certificate response message includes the certificate issued by the CA, and the acquiring module is further configured to acquire the certificate that is issued by the CA to the newly installed VNFC instance and that is included in the certificate response message when the authentication module determines that the certificate response message has been authenticated, where the certificate of the newly installed VNFC instance is obtained by the CA by signing, after a certificate application request message sent by the master VNFC has been authenticated according to the certificate of the master VNFC instance, the public key that is used by the newly installed VNFC instance to apply for a certificate and that is included in the certificate request message.

With reference to the possible implementation manner of the first aspect of the present application, or with reference to the first possible implementation manner of the first aspect of the present application, or with reference to the second possible implementation manner of the first aspect of the present application, in a third possible implementation manner, the certificate application representation message and the certificate request message further include private key proof of possession (POP) information.

With reference to the third possible implementation manner of the first aspect of the present application, in a fourth possible implementation manner, the POP information is obtained by the newly installed VNFC instance using a private key in a private-public key pair to sign a private key POP signing key field.

With reference to the possible implementation manner of the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, in a fifth possible implementation manner, the private-public key pair used by the newly installed VNFC instance is obtained in the manner of generating, by the newly installed VNFC instance, the private-public key pair, or generating, by a network function virtualization infrastructure (NFVI), the private-public key pair and injecting the private-public key pair into the newly installed VNFC instance.

With reference to the possible implementation manner of the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, or with reference to the fifth possible implementation manner of the first aspect of the present application, in a sixth possible implementation manner, the sending module is further configured to send, to the newly installed VNFC instance by means of an internal network, the acquired certificate issued by the CA to the newly installed VNFC instance after the acquiring module acquires the certificate issued by the CA to the newly installed VNFC instance.

With reference to the possible implementation manner of the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, or with reference to the fifth possible implementation manner of the first aspect of the present application, or with reference to the sixth possible implementation manner of the first aspect of the present application, in a seventh possible implementation manner, the master VNFC instance and the newly installed VNFC instance are different components of a same VNF on a same NFVI platform.

According to a second aspect of the present application, a certificate acquiring device is provided, including a receiving module configured to receive a certificate request message sent by a master VNFC instance, where the certificate request message includes a certificate of the master VNFC instance and a public key used by a newly installed VNFC instance to apply for a certificate, a certificate issuing module configured to perform authentication on the certificate request message according to the certificate of the master VNFC instance that is received by the receiving module, and obtain a to-be-issued certificate by signing the public key used by the newly installed VNFC instance to apply for a certificate when the authentication succeeds, and a sending module configured to send, to the master VNFC instance, the to-be-issued certificate issued by the certificate issuing module.

With reference to the possible implementation manner of the second aspect of the present application, in a first possible implementation manner, the certificate issuing module is further configured to perform authentication on a signature of the certificate request message using the certificate of the master VNFC instance, and perform authentication on the received certificate of the master VNFC instance using an issued root CA certificate or an issued intermediate certificate.

With reference to the possible implementation manner of the second aspect of the present application, or with reference to the first possible implementation manner of the second aspect of the present application, in a second possible implementation manner, the certificate request message further includes private key POP information.

With reference to the second possible implementation manner of the second aspect of the present application, in a third possible implementation manner, the certificate issuing module is further configured to perform authentication on, using the public key that is used to apply for a certificate and that is included in the certificate request message, the POP information included in the certificate request message.

According to a third aspect of the present application, a certificate acquiring device is provided, including a sending module configured to send a certificate application representation message to a master VNFC instance, where the certificate application representation message includes a public key used by a newly installed VNFC instance to apply for a certificate, the certificate application representation message is used to request the master VNFC instance to send a certificate request message to a CA, the certificate request message is used to request the CA to issue a certificate to the newly installed VNFC instance, and the certificate request message includes a certificate of the master VNFC instance and the public key used by the newly installed VNFC instance to apply for a certificate, and a receiving module configured to receive a certificate that is issued by the CA and that is sent by the master VNFC instance, where the certificate is obtained by the CA by signing the public key used by the newly installed VNFC instance to apply for a certificate.

With reference to the possible implementation manner of the third aspect of the present application, in a first possible implementation manner, the receiving module is further configured to receive certificate application information sent by an NFV orchestrator (NFVO) or a VNF manager (VNFM) before the certificate application representation message is sent to the master VNFC, where the certificate application information includes information about the master VNFC instance used as an agent for certificate application.

With reference to the first possible implementation manner of the third aspect of the present application, in a second possible implementation manner, the device further includes an establishment module configured to establish, according to the certificate application information received by the receiving module, a network connection to the master VNFC instance used as an agent for certificate application before the certificate application representation message is sent to the master VNFC, where the network connection is a network connection inside a VNF on a same NFVI platform.

With reference to the first possible implementation manner of the third aspect of the present application, or with reference to the second possible implementation manner of the third aspect of the present application, in a third possible implementation manner, the receiving module is further configured to during installation, receive the certificate application information injected by an NFVI.

With reference to the first possible implementation manner of the third aspect of the present application, or with reference to the second possible implementation manner of the third aspect of the present application, or with reference to the third possible implementation manner of the third aspect of the present application, in a fourth possible implementation manner, the information about the master VNFC used as an agent for certificate application includes an IP address, a Media Access Control (MAC) identifier, and a virtual network information center (NIC) address that are of the master VNFC instance.

With reference to the possible implementation manner of the third aspect of the present application, or with reference to the first possible implementation manner of the third aspect of the present application, or with reference to the second possible implementation manner of the third aspect of the present application, or with reference to the third possible implementation manner of the third aspect of the present application, or with reference to the fourth possible implementation manner of the third aspect of the present application, in a fifth possible implementation manner, the public key used by the newly installed VNFC instance to apply for a certificate is obtained in the manner of generating, by the newly installed VNFC instance, a private-public key pair, or generating, by the NFVI, a private-public key pair and injecting the private-public key pair into the newly installed VNFC instance.

With reference to the possible implementation manner of the third aspect of the present application, or with reference to the first possible implementation manner of the third aspect of the present application, or with reference to the second possible implementation manner of the third aspect of the present application, or with reference to the third possible implementation manner of the third aspect of the present application, or with reference to the fourth possible implementation manner of the third aspect of the present application, or with reference to the fifth possible implementation manner of the third aspect of the present application, in a sixth possible implementation manner, a manner for triggering the newly installed VNFC instance to send the certificate application representation message to the master VNFC instance includes triggering by means of VNF instantiation, or triggering by means of VNF scale-out.

According to a fourth aspect of the present application, a certificate acquiring device is provided, including a signal receiver configured to receive a certificate application representation message sent by a newly installed VNFC instance, where the certificate application representation message includes a public key used by the newly installed VNFC instance to apply for a certificate, a signal transmitter configured to send a certificate request message to a CA according to the certificate application representation message, to request the CA to issue a certificate to the newly installed VNFC instance, where the certificate request message includes a certificate of a master VNFC instance and the public key used by the newly installed VNFC instance to apply for a certificate, and a processor configured to acquire the certificate issued by the CA, where the certificate is issued by the CA using the public key used by the newly installed VNFC instance to apply for a certificate.

With reference to the possible implementation manner of the fourth aspect of the present application, in a first possible implementation manner, the signal receiver is further configured to receive a certificate response message sent by the CA before the certificate issued by the CA is acquired, and the processor is further configured to perform authentication on the received certificate response message.

With reference to the first possible implementation manner of the fourth aspect of the present application, in a second possible implementation manner, the certificate response message includes the certificate issued by the CA, and the processor is further configured to acquire the certificate that is issued by the CA to the newly installed VNFC instance and that is included in the certificate response message when the certificate response message has been authenticated, where the certificate of the newly installed VNFC instance is obtained by the CA by signing, after a certificate application request message sent by the master VNFC has been authenticated according to the certificate of the master VNFC instance, the public key that is used by the newly installed VNFC instance to apply for a certificate and that is included in the certificate request message.

With reference to the possible implementation manner of the fourth aspect of the present application, or with reference to the first possible implementation manner of the fourth aspect of the present application, or with reference to the second possible implementation manner of the fourth aspect of the present application, in a third possible implementation manner, the certificate application representation message and the certificate request message further include private key POP information.

With reference to the third possible implementation manner of the fourth aspect of the present application, in a fourth possible implementation manner, the POP information is obtained by the newly installed VNFC instance using a private key in a private-public key pair to sign a private key POP signing key field.

With reference to the possible implementation manner of the fourth aspect of the present application, or with reference to the first possible implementation manner of the fourth aspect of the present application, or with reference to the second possible implementation manner of the fourth aspect of the present application, or with reference to the third possible implementation manner of the fourth aspect of the present application, or with reference to the fourth possible implementation manner of the fourth aspect of the present application, in a fifth possible implementation manner, the private-public key pair used by the newly installed VNFC instance is obtained in the manner of generating, by the newly installed VNFC instance, the private-public key pair, or generating, by a NFVI, the private-public key pair and injecting the private-public key pair into the newly installed VNFC instance.

With reference to the possible implementation manner of the fourth aspect of the present application, or with reference to the first possible implementation manner of the fourth aspect of the present application, or with reference to the second possible implementation manner of the fourth aspect of the present application, or with reference to the third possible implementation manner of the fourth aspect of the present application, or with reference to the fourth possible implementation manner of the fourth aspect of the present application, or with reference to the fifth possible implementation manner of the fourth aspect of the present application, in a sixth possible implementation manner, the signal transmitter is further configured to send, to the newly installed VNFC instance by means of an internal network, the acquired certificate issued by the CA to the newly installed VNFC instance after the certificate issued by the CA to the newly installed VNFC instance is acquired.

With reference to the possible implementation manner of the fourth aspect of the present application, or with reference to the first possible implementation manner of the fourth aspect of the present application, or with reference to the second possible implementation manner of the fourth aspect of the present application, or with reference to the third possible implementation manner of the fourth aspect of the present application, or with reference to the fourth possible implementation manner of the fourth aspect of the present application, or with reference to the fifth possible implementation manner of the fourth aspect of the present application, or with reference to the sixth possible implementation manner of the fourth aspect of the present application, in a seventh possible implementation manner, the master VNFC instance and the newly installed VNFC instance are different components of a same VNF on a same NFVI platform.

According to a fifth aspect of the present application, a certificate acquiring device is provided, including a signal receiver configured to receive a certificate request message sent by a master VNFC instance, where the certificate request message includes a certificate of the master VNFC instance and a public key used by a newly installed VNFC instance to apply for a certificate, a processor configured to perform authentication on the certificate request message according to the certificate of the master VNFC instance, and obtain a to-be-issued certificate by signing the public key used by the newly installed VNFC instance to apply for a certificate when the authentication succeeds, and a signal transmitter configured to send the to-be-issued certificate to the master VNFC instance.

With reference to the possible implementation manner of the fifth aspect of the present application, in a first possible implementation manner, the processor is further configured to perform authentication on a signature of the certificate request message using the certificate of the master VNFC instance, and perform authentication on the received certificate of the master VNFC instance using an issued root CA certificate or an issued intermediate certificate.

With reference to the possible implementation manner of the fifth aspect of the present application, or with reference to the first possible implementation manner of the fifth aspect of the present application, in a second possible implementation manner, the certificate request message further includes private key POP information.

With reference to the second possible implementation manner of the fifth aspect of the present application, in a third possible implementation manner, the processor is further configured to perform authentication on, by the CA, using the public key that is used to apply for a certificate and that is included in the certificate request message, the POP information included in the certificate request message.

According to a sixth aspect of the present application, a certificate acquiring device is provided, including a signal transmitter configured to send a certificate application representation message to a master VNFC instance, where the certificate application representation message includes a public key used by a newly installed VNFC instance to apply for a certificate, the certificate application representation message is used to request the master VNFC instance to send a certificate request message to a CA, the certificate request message is used to request the CA to issue a certificate to the newly installed VNFC instance, and the certificate request message includes a certificate of the master VNFC instance and the public key used by the newly installed VNFC instance to apply for a certificate, and a signal receiver configured to receive a certificate that is issued by the CA and that is sent by the master VNFC instance, where the certificate is obtained by the CA by signing the public key used by the newly installed VNFC instance to apply for a certificate.

With reference to the possible implementation manner of the sixth aspect of the present application, in a first possible implementation manner, the signal receiver is further configured to before the certificate application representation message is sent to the master VNFC, receive certificate application information sent by an NFVO or a VNFM, where the certificate application information includes information about the master VNFC instance used as an agent for certificate application.

With reference to the first possible implementation manner of the sixth aspect of the present application, in a second possible implementation manner, the device further includes a processor, where the processor is configured to establish, according to the certificate application information, a network connection to the master VNFC instance used as an agent for certificate application before the certificate application representation message is sent to the master VNFC, where the network connection is a network connection inside a VNF on a same NFVI platform.

With reference to the first possible implementation manner of the sixth aspect of the present application, or with reference to the second possible implementation manner of the sixth aspect of the present application, in a third possible implementation manner, the signal receiver is further configured to receive the certificate application information injected by an NFVI during installation.

With reference to the first possible implementation manner of the sixth aspect of the present application, or with reference to the second possible implementation manner of the sixth aspect of the present application, or with reference to the third possible implementation manner of the sixth aspect of the present application, in a fourth possible implementation manner, the information about the master VNFC used as an agent for certificate application includes an IP address, a MAC identifier, and a virtual NIC address that are of the master VNFC instance.

With reference to the possible implementation manner of the sixth aspect of the present application, or with reference to the first possible implementation manner of the sixth aspect of the present application, or with reference to the second possible implementation manner of the sixth aspect of the present application, or with reference to the third possible implementation manner of the sixth aspect of the present application, or with reference to the fourth possible implementation manner of the sixth aspect of the present application, in a fifth possible implementation manner, the public key used by the newly installed VNFC instance to apply for a certificate is obtained in the manner of generating, by the newly installed VNFC instance, a private-public key pair, or generating, by the NFVI, a private-public key pair and injecting the private-public key pair into the newly installed VNFC instance.

With reference to the possible implementation manner of the sixth aspect of the present application, or with reference to the first possible implementation manner of the sixth aspect of the present application, or with reference to the second possible implementation manner of the sixth aspect of the present application, or with reference to the third possible implementation manner of the sixth aspect of the present application, or with reference to the fourth possible implementation manner of the sixth aspect of the present application, or with reference to the fifth possible implementation manner of the sixth aspect of the present application, in a sixth possible implementation manner, a manner for triggering the newly installed VNFC instance to send the certificate application representation message to the master VNFC instance includes triggering by means of VNF instantiation, or triggering by means of VNF scale-out.

According to a seventh aspect of the present application, a certificate acquiring method is provided, including receiving, by a master VNFC instance, a certificate application representation message sent by a newly installed VNFC instance, where the certificate application representation message includes a public key used by the newly installed VNFC instance to apply for a certificate, sending, by the master VNFC instance, a certificate request message to a CA according to the certificate application representation message, to request the CA to issue a certificate to the newly installed VNFC instance, where the certificate request message includes a certificate of the master VNFC instance and the public key used by the newly installed VNFC instance to apply for a certificate, and acquiring, by the master VNFC instance, the certificate issued by the CA, where the certificate is issued by the CA using the public key used by the newly installed VNFC instance to apply for a certificate.

With reference to the possible implementation manner of the seventh aspect of the present application, in a first possible implementation manner, before acquiring, by the master VNFC instance, the certificate issued by the CA, the method further includes receiving, by the master VNFC instance, a certificate response message sent by the CA, and performing authentication on the received certificate response message.

With reference to the first possible implementation manner of the seventh aspect of the present application, in a second possible implementation manner, the certificate response message includes the certificate issued by the CA, and acquiring the certificate issued by the CA includes acquiring, by the master VNFC instance, the certificate that is issued by the CA to the newly installed VNFC instance and that is included in the certificate response message when the certificate response message has been authenticated, where the certificate of the newly installed VNFC instance is obtained by the CA by signing, after a certificate application request message sent by the master VNFC has been authenticated according to the certificate of the master VNFC instance, the public key that is used by the newly installed VNFC instance to apply for a certificate and that is included in the certificate request message.

With reference to the possible implementation manner of the seventh aspect of the present application, or with reference to the first possible implementation manner of the seventh aspect of the present application, or with reference to the second possible implementation manner of the seventh aspect of the present application, in a third possible implementation manner, the certificate application representation message and the certificate request message further include private key POP information.

With reference to the third possible implementation manner of the seventh aspect of the present application, in a fourth possible implementation manner, the POP information is obtained by the newly installed VNFC instance using a private key in a private-public key pair to sign a private key POP signing key field.

With reference to the possible implementation manner of the seventh aspect of the present application, or with reference to the first possible implementation manner of the seventh aspect of the present application, or with reference to the second possible implementation manner of the seventh aspect of the present application, or with reference to the third possible implementation manner of the seventh aspect of the present application, or with reference to the fourth possible implementation manner of the seventh aspect of the present application, in a fifth possible implementation manner, the private-public key pair used by the newly installed VNFC instance is obtained in the manner of generating, by the newly installed VNFC instance, the private-public key pair, or generating, by an NFVI, the private-public key pair and injecting the private-public key pair into the newly installed VNFC instance.

With reference to the possible implementation manner of the seventh aspect of the present application, or with reference to the first possible implementation manner of the seventh aspect of the present application, or with reference to the second possible implementation manner of the seventh aspect of the present application, or with reference to the third possible implementation manner of the seventh aspect of the present application, or with reference to the fourth possible implementation manner of the seventh aspect of the present application, or with reference to the fifth possible implementation manner of the seventh aspect of the present application, in a sixth possible implementation manner, after the acquiring, by the master VNFC instance, the certificate issued by the CA to the newly installed VNFC instance, the method further includes sending, by the master VNFC instance, to the newly installed VNFC instance by means of an internal network, the acquired certificate issued by the CA to the newly installed VNFC instance.

With reference to the possible implementation manner of the seventh aspect of the present application, or with reference to the first possible implementation manner of the seventh aspect of the present application, or with reference to the second possible implementation manner of the seventh aspect of the present application, or with reference to the third possible implementation manner of the seventh aspect of the present application, or with reference to the fourth possible implementation manner of the seventh aspect of the present application, or with reference to the fifth possible implementation manner of the seventh aspect of the present application, or with reference to the sixth possible implementation manner of the seventh aspect of the present application, in a seventh possible implementation manner, the master VNFC instance and the newly installed VNFC instance are different components of a same VNF on a same NFVI platform.

According to an eighth aspect of the present application, a certificate acquiring method is provided, including receiving, by a CA, a certificate request message sent by a master VNFC instance, where the certificate request message includes a certificate of the master VNFC instance and a public key used by a newly installed VNFC instance to apply for a certificate, performing, by the CA, authentication on the certificate request message according to the certificate of the master VNFC instance, and obtaining a to-be-issued certificate by signing the public key used by the newly installed VNFC instance to apply for a certificate when the authentication succeeds, and sending, by the CA, the to-be-issued certificate to the master VNFC instance.

With reference to the possible implementation manner of the eighth aspect of the present application, in a first possible implementation manner, the performing, by the CA, authentication on the certificate request message according to the certificate of the master VNFC includes performing, by the CA, authentication on a signature of the certificate request message using the certificate of the master VNFC instance, and performing authentication on the received certificate of the master VNFC instance using an issued root CA certificate or an issued intermediate certificate.

With reference to the possible implementation manner of the eighth aspect of the present application, or with reference to the first possible implementation manner of the eighth aspect of the present application, in a second possible implementation manner, the certificate request message further includes private key POP information.

With reference to the second possible implementation manner of the eighth aspect of the present application, in a third possible implementation manner, performing, by the CA, authentication on the certificate request message according to the certificate of the master VNFC further includes performing, by the CA, using the public key that is used to apply for a certificate and that is included in the certificate request message, authentication on the POP information included in the certificate request message.

According to a ninth aspect of the present application, a certificate acquiring method is provided, including sending, by a newly installed VNFC instance, a certificate application representation message to a master VNFC instance, where the certificate application representation message includes a public key used by the newly installed VNFC instance to apply for a certificate, the certificate application representation message is used to request the master VNFC instance to send a certificate request message to a CA, the certificate request message is used to request the CA to issue a certificate to the newly installed VNFC instance, and the certificate request message includes a certificate of the master VNFC instance and the public key used by the newly installed VNFC instance to apply for a certificate, and receiving, by the newly installed VNFC instance, a certificate that is issued by the CA and that is sent by the master VNFC instance, where the certificate is obtained by the CA by signing the public key used by the newly installed VNFC instance to apply for a certificate.

With reference to the possible implementation manner of the ninth aspect of the present application, in a first possible implementation manner, before sending a certificate application representation message to a master VNFC, the method further includes receiving, by the newly installed VNFC instance, certificate application information sent by an NFVO or a VNFM, where the certificate application information includes information about the master VNFC instance used as an agent for certificate application.

With reference to the first possible implementation manner of the ninth aspect of the present application, in a second possible implementation manner, before sending, by the newly installed VNFC instance, a certificate application representation message to a master VNFC, the method further includes establishing, by the newly installed VNFC instance, according to the certificate application information, a network connection to the master VNFC instance used as an agent for certificate application, where the network connection is a network connection inside a VNF on a same NFVI platform.

With reference to the first possible implementation manner of the ninth aspect of the present application, or with reference to the second possible implementation manner of the ninth aspect of the present application, in a third possible implementation manner, acquiring, by the newly installed VNFC instance, certificate application information includes receiving, by the newly installed VNFC instance, the certificate application information injected by an NFVI during installation.

With reference to the first possible implementation manner of the ninth aspect of the present application, or with reference to the second possible implementation manner of the ninth aspect of the present application, or with reference to the third possible implementation manner of the ninth aspect of the present application, in a fourth possible implementation manner, the information about the master VNFC used as an agent for certificate application includes an IP address, a MAC identifier, and a virtual NIC address that are of the master VNFC instance.

With reference to the possible implementation manner of the ninth aspect of the present application, or with reference to the first possible implementation manner of the ninth aspect of the present application, or with reference to the second possible implementation manner of the ninth aspect of the present application, or with reference to the third possible implementation manner of the ninth aspect of the present application, or with reference to the fourth possible implementation manner of the ninth aspect of the present application, in a fifth possible implementation manner, the public key used by the newly installed VNFC instance to apply for a certificate is obtained in the manner of generating, by the newly installed VNFC instance, a private-public key pair, or generating, by the NFVI, a private-public key pair and injecting the private-public key pair into the newly installed VNFC instance.

With reference to the possible implementation manner of the ninth aspect of the present application, or with reference to the first possible implementation manner of the ninth aspect of the present application, or with reference to the second possible implementation manner of the ninth aspect of the present application, or with reference to the third possible implementation manner of the ninth aspect of the present application, or with reference to the fourth possible implementation manner of the ninth aspect of the present application, or with reference to the fifth possible implementation manner of the ninth aspect of the present application, in a sixth possible implementation manner, a manner for triggering the newly installed VNFC instance to send the certificate application representation message to the master VNFC instance includes triggering by means of VNF instantiation, or triggering by means of VNF scale-out.

According to the embodiments of the present application, when another VNFC instance that has acquired a certificate exists on an NFVI platform, a trusted channel established between the other VNFC instance and a CA by the other VNFC instance is used to replace a newly installed VNFC instance to apply for a certificate such that not only the certificate can be acquired securely, but also a process is effectively simplified, a system reaction speed is increased, and system running efficiency is improved.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application, and persons of ordinary skill in the art may still derive other drawings from these accompanying drawings without creative efforts.

DESCRIPTION OF EMBODIMENTS

To achieve the objective of the present application, the embodiments of the present application provide a certificate acquiring method and device. A master VNFC instance receives a certificate application representation message sent by a newly installed VNFC instance, where the certificate application representation message includes a public key used by the newly installed VNFC instance to apply for a certificate, sends a certificate request message to a CA, where the certificate request message includes a certificate of the master VNFC instance and the public key used by the newly installed VNFC instance to apply for a certificate, and acquires a certificate issued by the CA, where the certificate is obtained by the CA by signing, after the certificate request message sent by the master VNFC instance has been authenticated according to the certificate of the master VNFC instance, the public key used by the newly installed VNFC instance to apply for a certificate.

In this way, the newly installed VNFC instance does not need to use a current manner for a VNF to acquire a certificate, which effectively avoids a problem of a cumbersome and more complex process caused when the newly installed VNFC instance acquires a certificate, by means of another VNFC instance that is on a same NFVI platform and that has acquired a certificate, a trusted channel established between the other VNFC instance and the CA by the other VNFC instance is used to replace the newly installed VNFC instance to apply for a certificate such that not only the certificate can be acquired securely, but also the process is effectively simplified, a system reaction speed is increased, and system running efficiency is improved.

It should be noted that, in the embodiments of the present application, the newly installed VNFC instance starts to be installed when a VNFC instantiation operation instruction or a VNF scale-out operation instruction is received, in the embodiments of the present application, when the newly installed VNFC instance needs to apply for a certificate, another VNFC instance that is on a same NFVI platform and that has acquired a certificate may be used as an agent to apply for a certificate.

The following describes the embodiments of the present application in detail with reference to the accompanying drawings in this specification.

Embodiment 1

Figure 1:
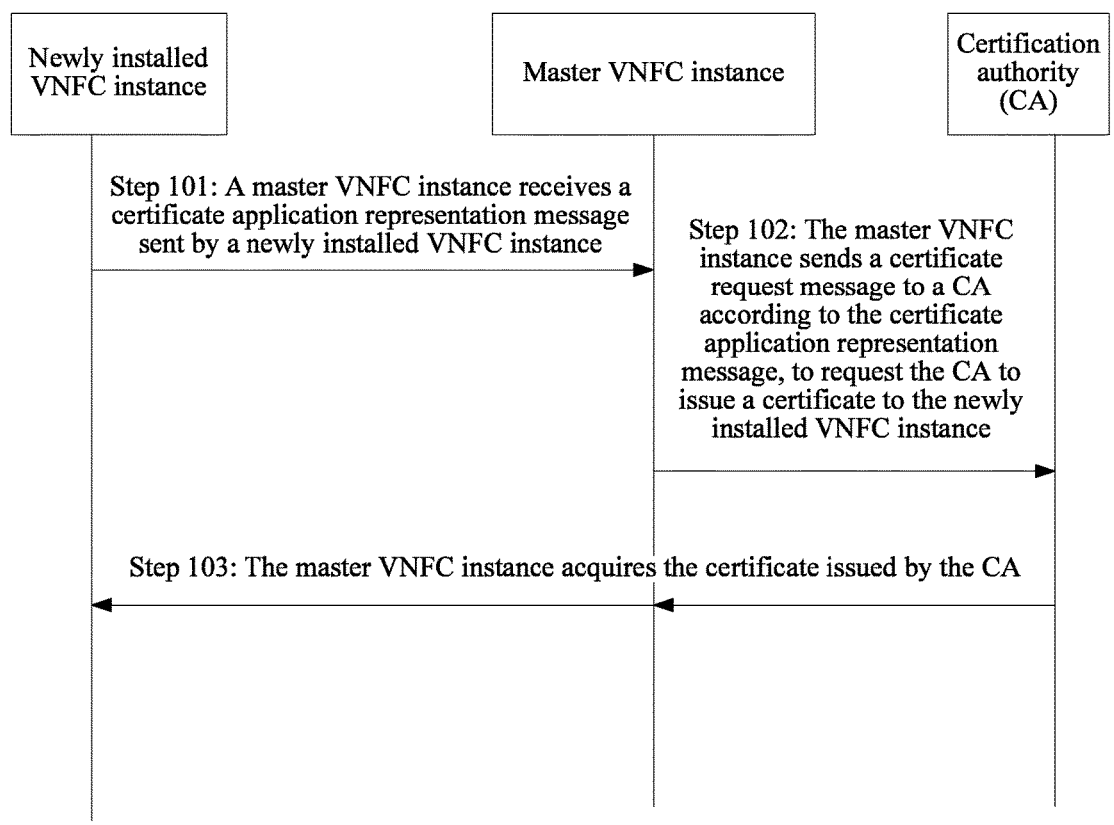
FIG. 1 is a schematic flowchart of a certificate acquiring method according to Embodiment 1 of the present application.

As shown in FIG. 1, FIG. 1 is a schematic flowchart of a certificate acquiring method according to Embodiment 1 of the present application. The method may be described as follows. This embodiment of the present application may be executed by an agent VNFC instance that needs to apply for a certificate for a newly installed VNFC instance, where the agent VNFC instance is also referred to as a master VNFC instance, or may be another VNF component that is in a VNFC instance associated with the newly installed VNFC instance and that has acquired a certificate.

Step 101: The master VNFC instance receives a certificate application representation message sent by the newly installed VNFC instance.

The certificate application representation message includes a public key used by the newly installed VNFC instance to apply for a certificate.

In step 101, when a VNFM receives an operation instruction used to install a new VNFC instance, the VNFM sends operation instruction authentication request information to an NFVO.

It should be noted that, the operation instruction used to install a new VNFC instance includes a VNFC instantiation operation instruction, a VNF scale-out operation instruction, or the like.

The operation instruction used to install a new VNFC instance may be manually or automatically triggered using an element management system (EMS), or may be obtained by the VNFM when collecting measurement data from a VNF and finding that scale-out needs to be performed, which is not limited herein.

When receiving the operation instruction authentication request information, the NFVO executes an operation decision, checks resource availability, and sends an operation instruction confirmation message to the VNFM.

The operation instruction confirmation message includes at least one or more of location information of a newly created VNFC instance or CA information.

The location information of the newly created VNFC instance may be virtualized infrastructure management (VIM) information associated with an NFVI in which the VNFC instance is located, for example, VIM identifier information or VIM address information.

The CA information may include an identifier of a CA in an operator domain, an IP address of a CA, or the like.

The CA may be a network element with a certificate issuing function, such as a certificate authority, a registration authority (RA), or an EMS.

In this case, the VNFM determines a certificate application policy of the newly installed VNFC instance according to location information of the master VNFC instance and the location information of the newly created VNFC instance. The location information of the newly created VNFC instance is sent by the NFVO to the VNFM using the operation instruction confirmation message.

The location information of the newly created VNFC instance may be VIM information associated with an NFVI in which the VNFC is located, for example, VIM identifier information or VIM address information.

The certificate application policy is used to determine an agent that applies for a certificate for the newly installed VNFC instance.

Further, the VNFM confirms, according to the location information of the master VNFC instance and the newly created VNFC instance, that the newly installed VNFC instance and the master VNFC instance are different components of a same VNF on a same NFVI platform.

Further, the VNFM confirms, according to the location information of the newly installed VNFC instance and the master VNFC instance and/or VNF identifier information, that the newly installed VNFC instance and the master VNFC instance are different components of a same VNF on a same NFVI platform.

After confirming that the newly installed VNFC instance and the master VNFC instance are different components of a same VNF on a same NFVI platform, the VNFM determines the certificate application policy of the newly installed VNFC instance, and sends certificate application information to the newly installed VNFC instance.

The certificate application policy deals with which manner is used to apply for a certificate for the newly created VNFC instance, and who is used as an agent if an agent mechanism is used.

The certificate application policy includes the certificate application information, where the certificate application information includes one or more of certificate application representation message or a certificate application manner indication.

The certificate application representation message includes identifier information of a certificate application agent, for example, an IP address, a MAC identifier, or a virtual NIC address.

The certificate application manner indication may be an explicit indication or an implicit indication. The explicit indication is, for example, an agent mechanism, and the implicit indication may be implied by means of specified agent information, or the like.

It should be noted that, the certificate application policy indicates the agent VNFC instance, that is, the master VNFC instance that applies for a certificate for the newly installed VNFC instance.

For example, for a VNFM agent or a master VNFC defined in NFV, the master VNFC may be the first VNFC created in a VNF instantiation process, and is configured to be responsible for internal management of the VNF, and in a VNF scale-out process, the master VNFC may be defined as a VNFC instance that is associated with a VNFC instance and that is located on a same NFVI hardware platform.

The VNFM sends a virtual machine (VM) creation message to a VIM, to request the VIM to allocate a resource to a to-be-installed VNFC, where the VM creation message includes certificate application information.

The VIM instructs the NFVI to create a VM, and sends the certificate application information to the NFVI, and the NFVI creates a VM, and sends a creation confirmation message to the VIM.

After the VM is created, the NFVI starts the VNFC instance in a secure manner, runs the newly installed VNFC instance on the created VM, and injects the certificate application information into the newly installed VNFC instance.

The newly installed VNFC instance determines, according to the certificate application representation message included in the certificate application information, a master VNFC instance that is used as an agent to perform certificate application, and sends the certificate application representation message to the master VNFC instance.

The certificate application representation message includes a public key used by the newly installed VNFC instance to apply for a certificate.

It should be noted that, the public key used by the newly installed VNFC instance to apply for a certificate may be determined in the manner of generating, by the newly installed VNFC instance, a private-public key pair, or when an NFVI instantiates the newly installed VNFC instance, generating a private-public key pair and injecting the private-public key pair into the newly installed VNFC instance.

In addition, the certificate application representation message may further include a certificate representation indication, CA information, or the like.

Step 102: The master VNFC instance sends a certificate request message to a CA according to the certificate application representation message, to request the CA to issue a certificate to the newly installed VNFC instance.

The certificate request message includes a certificate of the master VNFC instance and the public key used by the newly installed VNFC instance to apply for a certificate.

In step 102, it is assumed that the master VNFC instance is used as an agent for certificate application of the newly installed VNFC instance to replace the newly installed VNFC instance to register a certificate with the CA.

The master VNFC instance generates the certificate request message according to the certificate application representation message when receiving the certificate application representation message.

The certificate request message includes the certificate of the master VNFC instance and the public key used by the newly installed VNFC instance to apply for a certificate.

In addition, the master VNFC instance signs the generated certificate request message using a private key corresponding to an installation certificate.

The master VNFC instance sends the certificate request message to the CA.

In this case, when receiving the certificate request message sent by the master VNFC instance, the CA performs authentication on a signature of the received certificate request message using the certificate of the master VNFC instance, and performs authentication on the certificate of the master VNFC instance using a root CA certificate or an intermediate certificate.

It should be noted that, assuming that authentication is performed on the certificate of the master VNFC instance using an intermediate certificate, authentication also needs to be performed on the intermediate certificate using a root CA certificate.

The CA signs the public key used by the newly installed VNFC instance to apply for a certificate, and sends a certificate response message to the master VNFC when the authentication succeeds.

The certificate response message includes the certificate issued to the newly installed VNFC instance, and/or the root CA certificate or the like.

Step 103: The master VNFC instance acquires the certificate issued by the CA.

The certificate is issued by the CA according to the public key used by the newly installed VNFC instance to apply for a certificate.

In step 103, before the certificate issued by the CA is acquired, the method further includes receiving a certificate response message sent by the CA, and performing authentication on the received certificate response message.

Further, when receiving the certificate response message sent by the CA, the master VNFC instance performs authentication on a signature of the received certificate response message using the certificate of the master VNFC instance, and performs authentication on a CA certificate using a root CA certificate or an intermediate certificate.

It should be noted that, assuming that authentication is performed on a CA instance certificate using an intermediate certificate, authentication also needs to be performed on the intermediate certificate using a root CA certificate.

When the authentication succeeds, the master VNFC instance acquires the certificate that is issued by the CA to the newly installed VNFC instance and that is included in the certificate response message.

The certificate of the newly installed VNFC instance is obtained by the CA by signing, after the certificate request message sent by the master VNFC has been authenticated according to the certificate of the master VNFC instance, the public key that is used by the newly installed VNFC instance to apply for a certificate and that is included in the certificate request message.

In another implementation of the present application, the certificate application representation message and the certificate request message further include private key POP information.

The POP information is obtained by the newly installed VNFC instance using a private key in a private-public key pair to sign a private key POP signing key field.

The private-public key pair used by the newly installed VNFC instance is obtained in the manner of generating, by the newly installed VNFC instance, the private-public key pair, or generating the private-public key pair and injecting the private-public key pair into the newly installed VNFC instance when an NFVI instantiates the newly installed VNFC instance.

In another implementation of the present application, after the master VNFC instance acquires the certificate issued by the CA to the newly installed VNFC instance, the method further includes sending, to an NFVI, the acquired certificate issued by the CA to the newly installed VNFC instance such that the NFVI sends, to the newly installed VNFC instance for installation, the certificate issued by the CA to the newly installed VNFC instance.

After installing the certificate, the VNFC sends a certificate application completion acknowledge to the NFVI, the NFVI sends a certificate application completion to the VIM, and the VIM confirms resource allocation completion to the VNFM.

The VNFM configures the newly installed VNFC instance, deploys a particular parameter, and notifies the NFVO that the operation is completed. The NFVO maps the VNFC instance to the VIM and a resource pool. The VNFM sends a confirmation message to an EMS. The EMS adds or updates the VNFC instance to a manageable device, and the EMS performs application specific parameter configuration on the newly installed VNFC instance.

In this embodiment, if there is no direct interface between the master VNFC instance and the CA, the certificate request/response message may be forwarded by means of the EMS.

In this embodiment, the certificate that the newly installed VNFC instance applies for may also be issued by the EMS. In this case, the master VNFC instance replaces the newly installed VNFC instance to perform certificate registration with the EMS.

According to the solution of Embodiment 1 of the present application, after acquiring a certificate, a master VNFC instance may forward a certificate application message to a newly installed VNFC instance, and the newly installed VNFC instance does not need to use a current manner for a VNF to acquire a certificate, which effectively avoids a problem of a cumbersome and more complex process caused when the newly installed VNFC instance acquires a certificate, by means of another VNFC instance that is on a same NFVI platform and that has acquired a certificate, a trusted channel established between the other VNFC instance and the CA by the other VNFC instance is used to replace the newly installed VNFC instance to apply for a certificate such that not only the certificate can be acquired securely, but also the process is effectively simplified, a system reaction speed is increased, and system running efficiency is improved.

Embodiment 2

Figure 2:
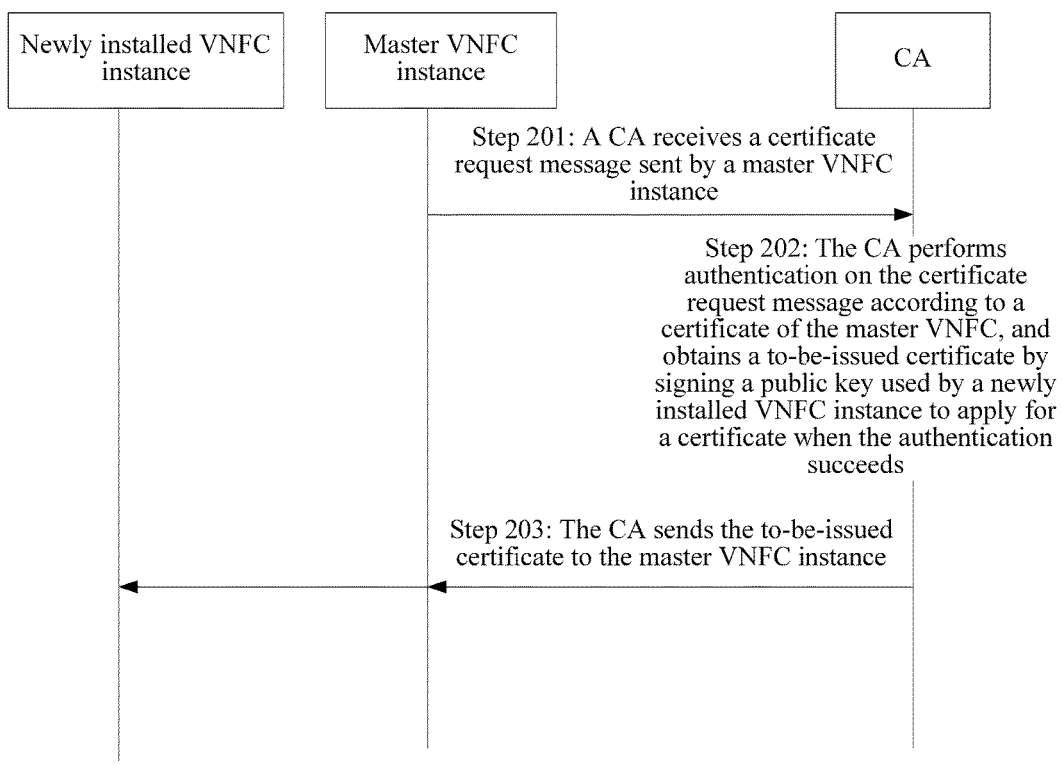
FIG. 2 is a schematic flowchart of a certificate acquiring method according to Embodiment 2 of the present application.

As shown in FIG. 2, FIG. 2 is a schematic flowchart of a certificate acquiring method according to Embodiment 2 of the present application. The method may be described as follows. This embodiment of the present application may be executed by a CA, or may be executed by another device with an issued certificate, for example, an RA or an EMS.

Step 201: The CA receives a certificate request message sent by a master VNFC instance.

The certificate request message includes a certificate of the master VNFC instance and a public key used by a newly installed VNFC to apply for a certificate.

In step 201, besides a VNFM Agent or a Master VNFC defined in NFV, the master VNFC instance that sends the certificate request message may further be another VNF component that is in a VNFC instance associated with the newly installed VNFC instance and that has acquired a certificate, which is not limited herein.

Step 202: The CA performs authentication on the certificate request message according to a certificate of the master VNFC, and obtains a to-be-issued certificate by signing a public key used by a newly installed VNFC instance to apply for a certificate when the authentication succeeds.

In step 202, that the CA performs authentication on the certificate request message according to a certificate of the master VNFC includes performing, by the CA, authentication on a signature of the certificate request message using the certificate of the master VNFC instance, and performing authentication on the received certificate of the master VNFC instance using an issued root CA certificate or an issued intermediate certificate.

Further, when receiving the certificate request message sent by the master VNFC instance, the CA performs authentication on the signature of the received certificate request message using the certificate of the master VNFC instance, and performs authentication on the certificate of the master VNFC instance using a root CA certificate or an intermediate certificate.

It should be noted that, assuming that authentication is performed on the certificate of the master VNFC instance using an intermediate certificate, authentication also needs to be performed on the intermediate certificate using a root CA certificate.

When the authentication succeeds, the CA signs the public key used by the newly installed VNFC instance to apply for a certificate, and generates a certificate response message.

The certificate response message includes the certificate issued to the newly installed VNFC instance, the root CA certificate, or the like.

In another embodiment of the present application, if the certificate request message further includes POP information, the manner for performing authentication on the certificate request message further includes performing, using the public key that is used to apply for a certificate and that is included in the certificate request message, authentication on the POP information included in the certificate request message.

Step 203: The CA sends the to-be-issued certificate to the master VNFC instance.

In step 203, the CA sends the generated certificate response message to the master VNFC instance, where the certificate response message includes the certificate issued to the newly installed VNFC instance, and/or the root CA certificate, or the like.

According to the solution of Embodiment 2 of the present application, by means of another VNFC instance that is on a same NFVI hardware platform and that has acquired a certificate, a trusted channel established between the other VNFC instance and a CA by the other VNFC instance is used to replace a newly installed VNFC instance to apply for a certificate such that not only the certificate can be acquired securely, but also a process is effectively simplified, a system reaction speed is increased, and system running efficiency is improved.

Embodiment 3

Figure 3:
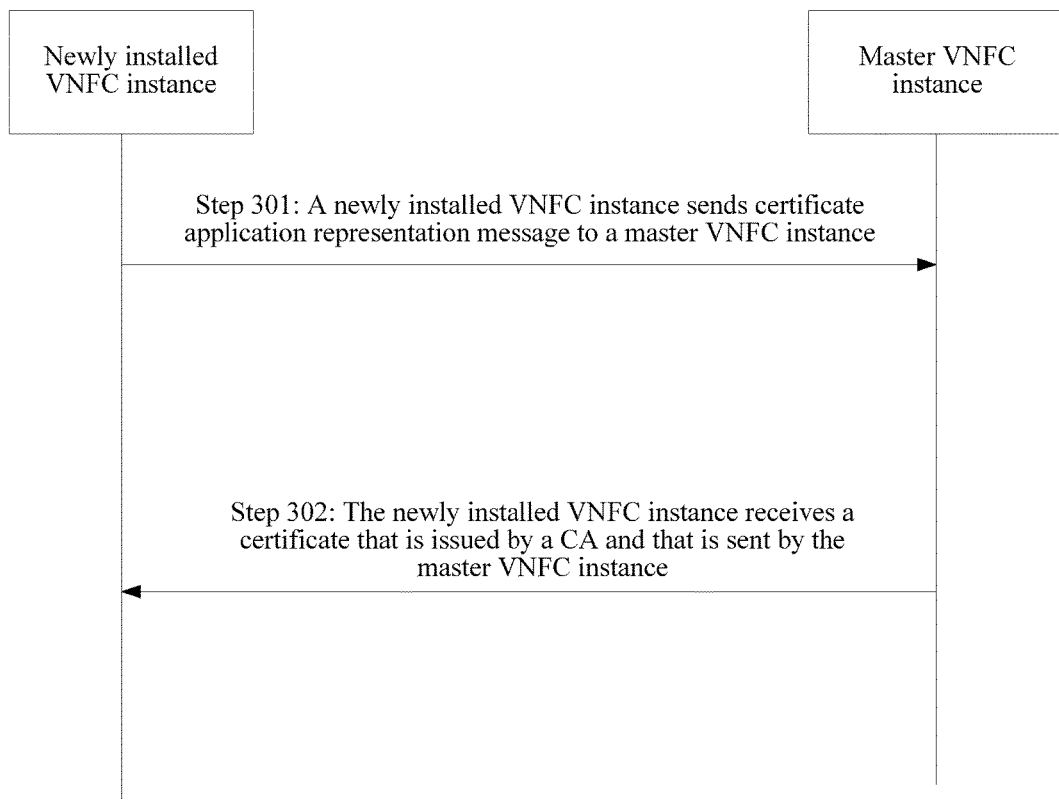
FIG. 3 is a schematic flowchart of a certificate acquiring method according to Embodiment 3 of the present application.

As shown in FIG. 3, FIG. 3 is a schematic flowchart of a certificate acquiring method according to Embodiment 3 of the present application. The method may be described as follows. This embodiment of the present application is executed by a newly installed VNFC instance.

Step 301: The newly installed VNFC instance sends a certificate application representation message to a master VNFC instance.

The certificate application representation message includes a public key used by the newly installed VNFC instance to apply for a certificate, the certificate application representation message is used to request the master VNFC instance to send a certificate request message to a CA, the certificate request message is used to request the CA to issue a certificate to the newly installed VNFC instance, and the certificate request message includes a certificate of the master VNFC instance and the public key used by the newly installed VNFC instance to apply for a certificate.

In step 301, before the certificate application representation message is sent to the master VNFC instance, the method further includes receiving, by the newly installed VNFC instance, certificate application information sent by an NFVO or a VNFM.

The certificate application information includes information about the master VNFC instance used as an agent for certificate application.

Further, during an installation process, the newly installed VNFC instance receives certificate application policy message injected by an NFVI.

A manner for determining the certificate application policy message includes but is not limited to the following two types.

First type: An NFVO determines the certificate application policy information according to location information of the master VNFC and a newly created VNFC instance.

Second type: The VNFM determines the certificate application policy information according to location information of the master VNFC and a newly created VNFC instance, where the location information of the newly created VNFC instance is sent by the NFVO to the VNFM.

The location information of the master VNFC and the newly created VNFC instance includes VIM information associated with an NFVI in which the master VNFC and the newly created VNFC instance are located, such as VIM identifier information or VIM address information.

In the first type, the NFVO determines a certificate application policy according to the location information of the master VNFC and the newly created VNFC instance using a specific manner as when the NFVO receives an operation instruction used to install a new VNFC instance, sending, by the NFVO, operation instruction authentication request information to the VNFM.

It should be noted that, the operation instruction used to install a new VNFC instance includes a VNFC instantiation operation instruction, a VNF scale-out operation instruction, or the like.

The operation instruction used to install a new VNFC instance may be manually or automatically triggered using an EMS, or may be obtained by the NFVO when collecting measurement data from a VNF and finding that scale-out needs to be performed, which is not limited herein.

The VNFM sends an operation instruction confirmation message to the NFVO when receiving the operation instruction authentication request information.

The NFVO executes an operation decision, checks resource availability, and selects a resource pool and reserves a resource when receiving the operation instruction confirmation message.

The NFVO determines a certificate application policy of the newly installed VNFC instance according to the location information of the master VNFC instance and the newly created VNFC instance, and sends the certificate application policy to the VNFM.

Further, the NFVO confirms, according to the location information of the master VNFC instance and the newly created VNFC instance, that the newly installed VNFC instance and the master VNFC instance are different components of a same VNF on a same NFVI platform.

Further, the NFVO confirms, according to the location information of the newly installed VNFC instance and the master VNFC instance and/or VNF identifier information, that the newly installed VNFC instance and the master VNFC instance are different components of a same VNF on a same NFVI platform.

After confirming that the newly installed VNFC instance and the master VNFC instance are different components of a same VNF on a same NFVI platform, the NFVO determines a certificate application policy of the newly installed VNFC instance, and sends certificate application information to the newly installed VNFC instance.

The certificate application policy deals with which manner is used to apply for a certificate for the newly created VNFC instance, and who is used as an agent if an agent mechanism is used.

In the second type, the VNFM determines a certificate application policy according to the location information of the master VNFC and the newly created VNFC instance using a specific manner as when the VNFM receives an operation instruction used to install a new VNFC instance, sending, by the VNFM, operation instruction authentication request information to the NFVO.

It should be noted that, the operation instruction used to install a new VNFC instance includes a VNFC instantiation operation instruction, a VNF scale-out operation instruction, or the like.

The operation instruction used to install a new VNFC instance may be manually or automatically triggered using an EMS, or may be obtained by the VNFM when collecting measurement data from a VNF and finding that scale-out needs to be performed, which is not limited herein.

The NFVO executes an operation decision, checks resource availability, selects a resource pool, reserves a resource, and sends an operation instruction confirmation message to the VNFM when receiving the operation instruction authentication request information.

The operation instruction confirmation message includes location information of the newly created VNFC instance, and/or location information of the master VNFC instance, and/or CA information.

The CA information may include an identifier of a CA in an operator domain, an IP address of a CA, or the like.

The CA may be an entity with a certificate issuing function, such as a CA, an RA, or an EMS.

In this case, the VNFM determines a certificate application policy of the newly installed VNFC instance according to the location information of the master VNFC instance and the newly created VNFC instance, where the location information of the newly created VNFC instance is sent by the NFVO to the VNFM using the operation instruction confirmation message.

Further, the VNFM confirms, according to the location information of the master VNFC instance and the newly created VNFC instance, that the newly installed VNFC instance and the master VNFC instance are different components of a same VNF on a same NFVI platform.

Further, the VNFM confirms, according to the location information of the newly installed VNFC instance and the master VNFC instance and/or VNF identifier information, that the newly installed VNFC instance and the master VNFC instance are different components of a same VNF on a same NFVI platform.

After confirming that the newly installed VNFC instance and the master VNFC instance are different components of a same VNF on a same NFVI platform, the VNFM determines a certificate application policy of the newly installed VNFC instance, and sends certificate application information to the newly installed VNFC instance.

The certificate application policy deals with which manner is used to apply for a certificate for the newly created VNFC instance, and who is used as an agent if an agent mechanism is used.

Therefore, as can be seen, the difference between the first manner for determining a certificate application policy and the second manner for determining a certificate application policy lies in the first manner, the certificate application policy is determined by the NFVO, and in the second manner, the certificate application policy is determined by the VNFM.

The certificate application policy includes certificate application information, where the certificate application information includes one or more of certificate application representation message or a certificate application manner indication.

The certificate application information is sent to the newly installed VNFC instance after the NFVO or the VNFM determines the certificate application policy of the newly installed VNFC instance.

Further, the certificate application information is generated after the NFVO or the VNFM confirms that the newly installed VNFC instance and the master VNFC instance are different components of a same VNF on a same NFVI platform.

Further, the NFVO or the VNFM confirms, according to the location information of the newly installed VNFC instance and the master VNFC instance and/or VNF identifier information, that the newly installed VNFC instance and the master VNFC instance are different components of a same VNF on a same NFVI platform.

The certificate application representation message includes identifier information of a certificate application agent, for example, an IP address, a MAC identifier, or a virtual NIC address.

The certificate application manner indication may be an explicit indication or an implicit indication. The explicit indication is, for example, an agent mechanism, and the implicit indication may be implied by specified agent information, or the like.

It should be noted that, the certificate application policy indicates the agent VNFC instance, that is, the master VNFC instance that applies for a certificate for the newly installed VNFC instance.

For example, for a VNFM agent or a master VNFC defined in NFV, the master VNFC is the first VNFC created in a VNF instantiation process, and is configured to be responsible for internal management of the VNF, and in a VNF scale-out process, the master VNFC instance may be defined as a VNFC that is associated with a VNFC instance and that is located on a same NFVI hardware platform.

Likewise, for the first manner for determining a certificate application policy, after the NFVO determines a certificate application policy, the NFVO sends a VM creation message to a VIM, to request the VIM to allocate a resource to a to-be-installed VM, where the VM creation message includes certificate application information.

The VIM instructs the NFVI to create a VM, and sends the certificate application information to the NFVI, and the NFVI creates the VM, and sends a creation confirmation message to the VIM.

After the VM is created, the NFVI starts the newly installed VNFC instance in a secure manner, runs the newly installed VNFC instance on the created VM, and injects the certificate application information into the newly installed VNFC instance.

For the second manner for determining a certificate application policy, after the VNFM determines a certificate application policy, the VNFM sends a VM creation message to a VIM, to request the VIM to allocate a resource to a to-be-installed VM, where the VM creation message includes certificate application information.

The VIM instructs the NFVI to create a VM, and sends the certificate application information to the NFVI, and the NFVI creates the VM, and sends a creation confirmation message to the VIM.

After the VM is created, the NFVI starts the VNFC in a secure manner, runs the newly installed VNFC instance on the created VM, and injects the certificate application information into the newly installed VNFC instance.

In another embodiment of the present application, the method further includes establishing, by the newly installed VNFC instance according to the certificate application information, a network connection to a master VNFC instance used as an agent for certificate application.

The network connection is a network connection inside a VNF on a same NFVI platform.

The newly installed VNFC instance determines, according to the certificate application representation message included in the certificate application information, the master VNFC instance that is used as an agent to perform certificate application, and sends a certificate application representation message to the master VNFC instance.

Further, the information about the master VNFC used as an agent for certificate application includes an IP address, a MAC identifier, and a virtual NIC address that are of the master VNFC instance.

The certificate application representation message includes a public key used by the newly installed VNFC instance to apply for a certificate.

It should be noted that, the public key used by the newly installed VNFC instance to apply for a certificate may be determined in the manner of generating, by the newly installed VNFC instance, a private-public key pair, or generating a private-public key pair and injecting the private-public key pair into the newly installed VNFC instance when an NFVI instantiates the newly installed VNFC instance.

The certificate application representation message further includes POP information, where the POP information is obtained by the newly installed VNFC instance using a private key in a private-public key pair to sign a private key POP signing key field.

In addition, the certificate application representation message may further include a certificate representation indication, CA information, or the like.

Step 302: The newly installed VNFC instance receives a certificate that is issued by a CA and that is sent by the master VNFC instance.

The certificate is obtained by the CA by signing the public key used by the newly installed VNFC instance to apply for a certificate when the certificate request message sent by the master VNFC instance has been authenticated according to the certificate of the master VNFC instance.

The CA may be an entity with a certificate issuing function, such as a CA, an RA, or an EMS.

It should be noted that, before the certificate application representation message is sent to the master VNFC instance, the method further includes determining that installation of the newly installed VNFC instance is triggered by VNF instantiation, or determining that installation of the newly installed VNFC instance is triggered by VNF scale-out.

According to the solution of Embodiment 3 of the present application, by means of another VNFC instance that is on a same NFVI platform and that has acquired a certificate, a trusted channel established between the other VNFC instance and a CA by the other VNFC instance is used to replace a newly installed VNFC instance to apply for a certificate such that not only the certificate can be acquired securely, but also a process is effectively simplified, a system reaction speed is increased, and system running efficiency is improved.

Embodiment 4

Figure 4A:
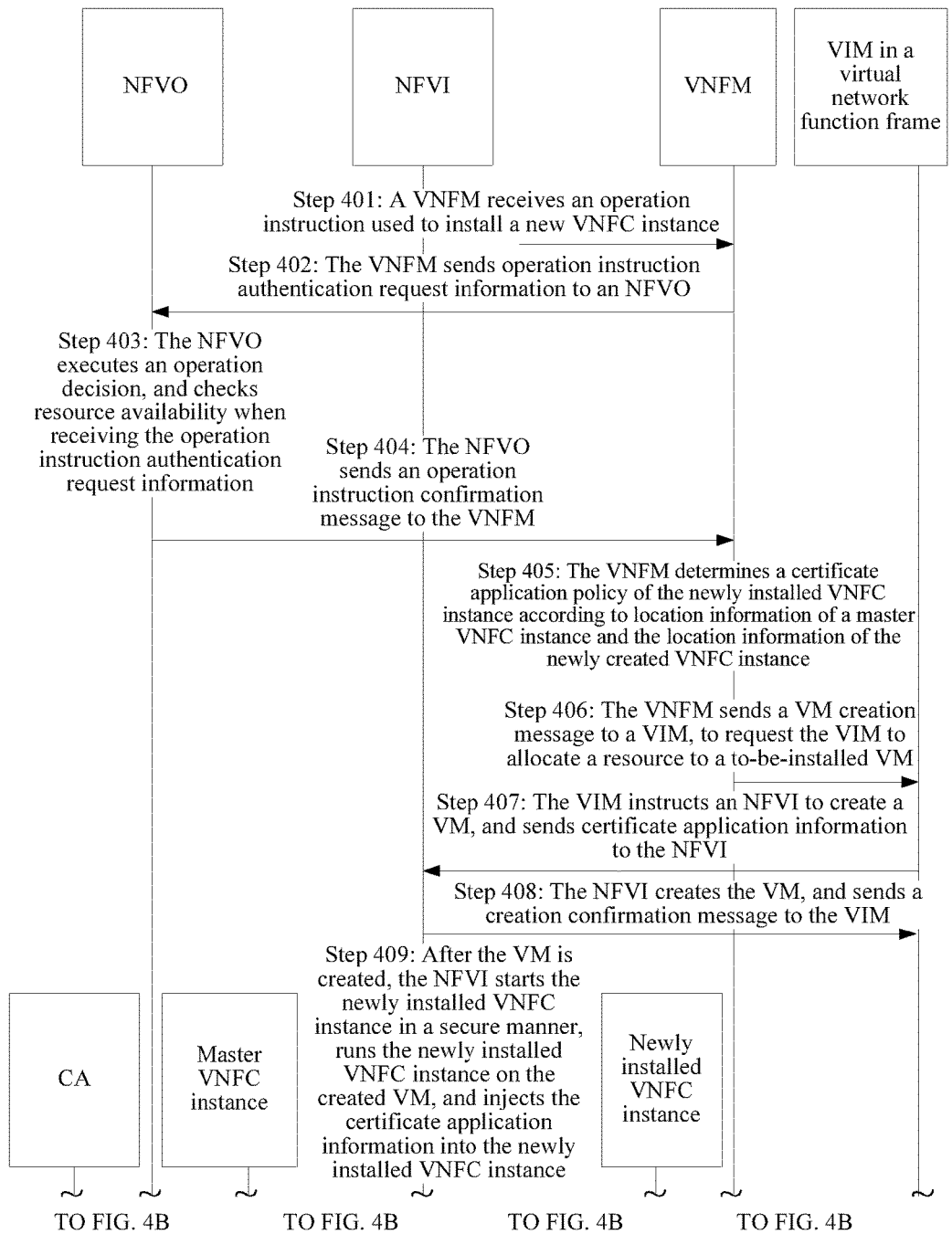
FIG. 4A and FIG. 4B are schematic flowcharts of a certificate acquiring method according to Embodiment 4 of the present application.
Figure 4B:
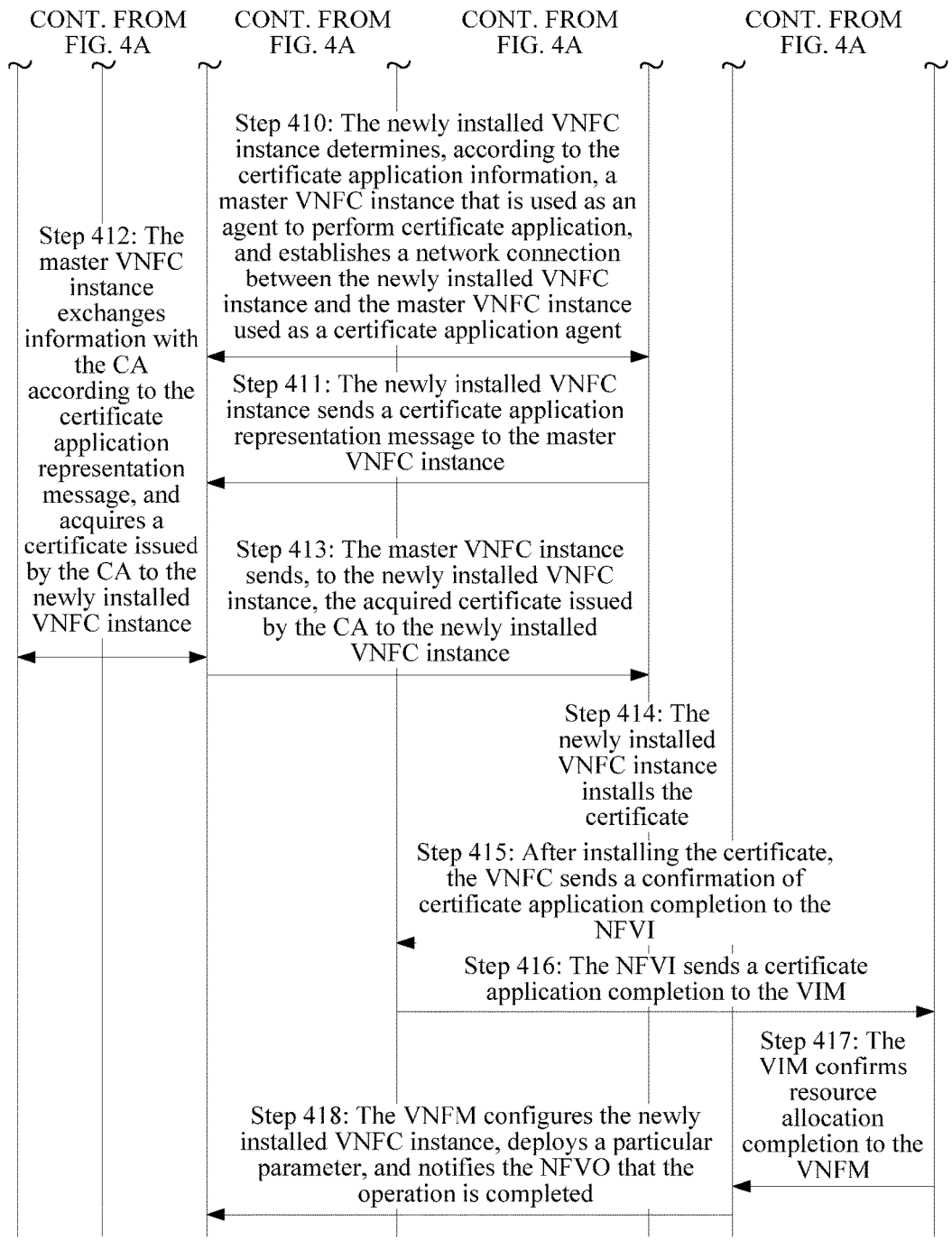

As shown in FIG. 4A and FIG. 4B, FIG. 4A and FIG. 4B are schematic flowcharts of a certificate acquiring method according to Embodiment 4 of the present application. The method may be described as follows.

Step 401: A VNFM receives an operation instruction used to install a new VNFC instance.

It should be noted that, the operation instruction used to install a new VNFC instance includes a VNFC instantiation operation instruction, a VNF scale-out operation instruction, or the like.

The operation instruction used to install a new VNFC instance may be manually or automatically triggered using an EMS, or may be obtained by the VNFM when collecting measurement data from a VNF and finding that scale-out needs to be performed, which is not limited herein.

Step 402: The VNFM sends operation instruction authentication request information to an NFVO.

Step 403: The NFVO executes an operation decision, and checks resource availability when receiving the operation instruction authentication request information.

Step 404: The NFVO sends an operation instruction confirmation message to the VNFM.

The operation instruction confirmation message includes location information of a newly created VNFC instance and/or CA information.

The location information of the newly created VNFC instance is VIM information associated with an NFVI in which the newly created VNFC instance is located, for example, VIM identifier information or VIM address information.

The CA information may include an identifier of a CA in an operator domain, an IP address of a CA, or the like. The CA may be an entity with a certificate issuing function, such as a CA, an RA, or an EMS.

Step 405: The VNFM determines a certificate application policy of the newly installed VNFC instance according to location information of a master VNFC instance and the location information of the newly created VNFC instance.

The certificate application policy is used to determine an agent that applies for a certificate for the newly installed VNFC instance.

Further, the VNFM confirms, according to the location information of the master VNFC instance and the newly created VNFC instance, that the newly installed VNFC instance and the master VNFC instance are different components of a same VNF on a same NFVI platform.

Further, the VNFM confirms, according to the location information of the newly installed VNFC instance and the master VNFC instance and/or VNF identifier information, that the newly installed VNFC instance and the master VNFC instance are different components of a same VNF on a same NFVI platform.

After confirming that the newly installed VNFC instance and the master VNFC instance are different components of a same VNF on a same NFVI platform, the VNFM determines a certificate application policy of the newly installed VNFC instance, and sends certificate application information to the newly installed VNFC instance.

The certificate application policy deals with which manner is used to apply for a certificate for the newly created VNFC instance, and who is used as an agent if an agent mechanism is used.

The certificate application policy includes certificate application information, where the certificate application information includes one or more of certificate application representation message or a certificate application manner indication.

The certificate application information is sent to the newly installed VNFC instance after the VNFM determines the certificate application policy of the newly installed VNFC instance.

Further, the certificate application information is generated after the VNFM confirms that the newly installed VNFC instance and the master VNFC instance are different components of a same VNF on a same NFVI platform.

Further, the VNFM confirms, according to the location information of the newly installed VNFC instance and the master VNFC instance and/or VNF identifier information, that the newly installed VNFC instance and the master VNFC instance are different components of a same VNF on a same NFVI platform.

The certificate application representation message includes identifier information of a certificate application agent, for example, an IP address, a MAC identifier, or a virtual NIC address.

The certificate application manner indication may be an explicit indication or an implicit indication. The explicit indication is, for example, an agent mechanism, and the implicit indication may be implied by specified agent information, or the like.

It should be noted that, the certificate application policy indicates the agent VNFC instance, that is, the master VNFC instance that applies for a certificate for the newly installed VNFC instance.

For example, for a VNFM agent or a master VNFC defined in NFV, the master VNFC is the first VNFC created in a VNF instantiation process, and is configured to be responsible for internal management of the VNF, and in a VNF scale-out process, the master VNFC may be defined as a VNFC instance that is associated with a VNFC instance and that is located on a same NFVI hardware platform.

Step 406: The VNFM sends a VM creation message to a VIM, to request the VIM to allocate a resource to a to-be-installed VM.

The VM creation message includes certificate application information.

Step 407: The VIM instructs an NFVI to create a VM, and sends certificate application information to the NFVI.

Step 408: The NFVI creates the VM, and sends a creation confirmation message to the VIM.

Step 409: After the VM is created, the NFVI starts the newly installed VNFC instance in a secure manner, runs the newly installed VNFC instance on the created VM, and injects the certificate application information into the newly installed VNFC instance.

Step 410: The newly installed VNFC instance determines, according to the certificate application information, a master VNFC instance that is used as an agent to perform certificate application, and establishes a network connection to the master VNFC instance used as an agent for certificate application.

The network connection is a network connection inside a VNF on a same NFVI platform.

Step 411: The newly installed VNFC instance sends a certificate application representation message to the master VNFC instance.

The certificate application representation message includes a public key used by the newly installed VNFC instance to apply for a certificate.

It should be noted that, the public key used by the newly installed VNFC instance to apply for a certificate may be determined in the manner of generating, by the newly installed VNFC instance, a private-public key pair, or generating a private-public key pair and injecting the private-public key pair into the newly installed VNFC instance when a NFVI instantiates the newly installed VNFC instance.

The certificate application representation message further includes POP information, where the POP information is obtained by the newly installed VNFC instance using a private key in a private-public key pair to sign a private key POP signing key POP Signing Key field.

In addition, the certificate application representation message may further include a certificate representation indication, CA information, or the like.

Step 412: The master VNFC instance exchanges information with a CA according to the certificate application representation message, and acquires a certificate issued by the CA to the newly installed VNFC instance.

A specific implementation manner of step 412 is the same as the manner in which the master VNFC instance replaces the newly installed VNFC instance to acquire the certificate issued by the CA to the newly installed VNFC instance in Embodiment 1 of the present application, Embodiment 2 of the present application, and Embodiment 3 of the present application, and details are not described herein.

Step 413: The master VNFC instance sends, to the newly installed VNFC instance by means of an internal network connection, the acquired certificate issued by the CA to the newly installed VNFC instance.

Step 414: The newly installed VNFC instance installs the certificate.

Step 415: After installing the certificate, the VNFC sends a certificate application completion acknowledge to the NFVI.

Step 416: The NFVI sends a certificate application completion to the VIM.

Step 417: The VIM confirms resource allocation completion to the VNFM.

Step 418: The VNFM configures the newly installed VNFC instance, deploys a particular parameter, and notifies the NFVO that the operation is completed.

In addition, the NFVO maps the VNFC instance to the VIM and a resource pool. The VNFM sends a confirmation message to an EMS. The EMS adds or updates the VNFC instance to a manageable device, and the EMS performs application specific parameter configuration on the newly installed VNFC instance.

In this embodiment, if there is no direct interface between the master VNFC instance and the CA, the certificate request/response message may be forwarded by means of the EMS.

In this embodiment, the certificate that the newly installed VNFC instance applies for may also be issued by the EMS.

In this case, the master VNFC instance replaces the newly installed VNFC instance to perform certificate registration with the EMS.

According to the solution of Embodiment 4 of the present application, by means of another VNFC instance that is on a same NFVI platform and that has acquired a certificate, a trusted channel established between the other VNFC instance and a CA by the other VNFC instance is used to replace a newly installed VNFC instance to apply for a certificate such that not only the certificate can be acquired securely, but also a process is effectively simplified, a system reaction speed is increased, and system running efficiency is improved.

Embodiment 5

Embodiment 5 of the present application provides a certificate acquiring method. The certificate acquiring method provided by Embodiment 5 of the present application and the certificate acquiring method provided by Embodiment 4 are basically the same, and also have a difference. The largest difference lies in different manners for determining a certificate application policy.

Further, the NFVO sends operation instruction authentication request information to a VNFM when an NFVO receives an operation instruction used to install a new VNFC instance.

It should be noted that, the operation instruction used to install a new VNFC instance includes a VNFC instantiation operation instruction, a VNF scale-out operation instruction, or the like.

The operation instruction used to install a new VNFC instance may be manually or automatically triggered using an EMS, or may be obtained by the NFVO when collecting measurement data from a VNF and finding that scale-out needs to be performed, which is not limited herein.

The VNFM sends an operation instruction confirmation message to the NFVO when receiving the operation instruction authentication request information.

The NFVO executes an operation decision, checks resource availability, and selects a resource pool and reserves a resource when receiving the operation instruction confirmation message. The NFVO determines a certificate application policy of the newly installed VNFC instance according to location information of a master VNFC instance and a newly created VNFC instance, and sends the certificate application policy to the VNFM.

The certificate application policy includes certificate application information.

The certificate application information is sent to the newly installed VNFC instance after the NFVO determines the certificate application policy of the newly installed VNFC instance.

Further, the certificate application information is generated after the NFVO confirms that the newly installed VNFC instance and the master VNFC instance are different components of a same VNF on a same NFVI platform.

Further, the NFVO confirms, according to the location information of the newly installed VNFC instance and the master VNFC instance and/or VNF identifier information, that the newly installed VNFC instance and the master VNFC instance are different components of a same VNF on a same NFVI platform.

Embodiment 6

Figure 5:
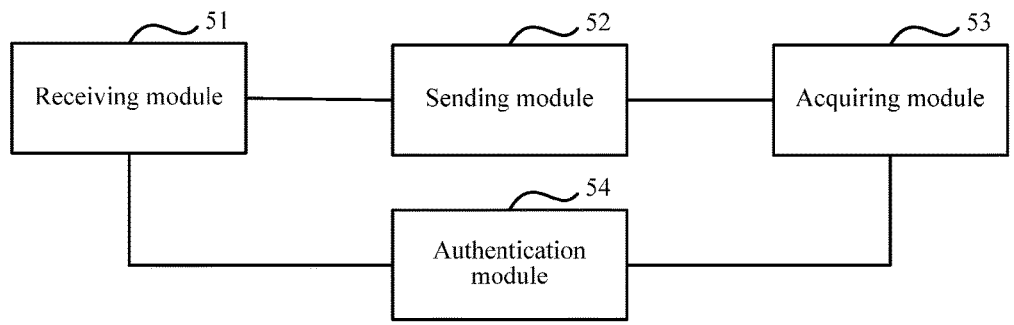
FIG. 5 is a schematic structural diagram of a certificate acquiring device according to Embodiment 6 of the present application.

As shown in FIG. 5, FIG. 5 is a schematic structural diagram of a certificate acquiring device according to Embodiment 6 of the present application. The device includes a receiving module 51, a sending module 52, and an acquiring module 53.

The receiving module 51 is configured to receive a certificate application representation message sent by a newly installed VNFC instance, where the certificate application representation message includes a public key used by the newly installed VNFC instance to apply for a certificate.

The sending module 52 is configured to send a certificate request message to a CA according to the certificate application representation message received by the receiving module 51, and request the CA to issue a certificate to the newly installed VNFC instance, where the certificate request message includes a certificate of a master VNFC instance and the public key used by the newly installed VNFC instance to apply for a certificate.

The acquiring module 53 is configured to acquire the certificate issued by the CA, where the certificate is issued by the CA using the public key used by the newly installed VNFC instance to apply for a certificate.

Optionally, the device further includes an authentication module 54.

Before the acquiring module 53 acquires the certificate issued by the CA, the receiving module 51 is further configured to receive a certificate response message sent by the CA.

The authentication module 54 is configured to perform authentication on the certificate response message received by the receiving module 51.

Further, the certificate response message includes the certificate issued by the CA.

The acquiring module 53 is further configured to acquire the certificate that is issued by the CA to the newly installed VNFC instance and that is included in the certificate response message when the authentication module 54 determines that the certificate response message has been authenticated, where the certificate of the newly installed VNFC instance is obtained by the CA by signing, after a certificate application request message sent by the master VNFC has been authenticated according to the certificate of the master VNFC instance, the public key that is used by the newly installed VNFC instance to apply for a certificate and that is included in the certificate request message.

Optionally, the certificate application representation message and the certificate request message further include private key POP information.

Optionally, the POP information is obtained by the newly installed VNFC instance using a private key in a private-public key pair to sign a private key POP signing key field.

Optionally, the private-public key pair used by the newly installed VNFC instance is obtained in the manner of generating, by the newly installed VNFC instance, the private-public key pair, or generating, by a NFVI, the private-public key pair and injecting the private-public key pair into the newly installed VNFC instance.

The sending module 52 is further configured to send, to the newly installed VNFC instance by means of an internal network, the acquired certificate issued by the CA to the newly installed VNFC instance after the acquiring module 53 acquires the certificate issued by the CA to the newly installed VNFC instance.

The master VNFC instance and the newly installed VNFC instance are different components of a same VNF on a same NFVI platform.

It should be noted that, the device in this embodiment of the present application may be another component that belongs to, together with the newly installed VNFC instance, a same VNF on a same NFVI platform, for example, a master VNFC instance. An implementation manner may be implemented in a hardware manner, or may be implemented in a software manner.

Embodiment 7

Figure 6:
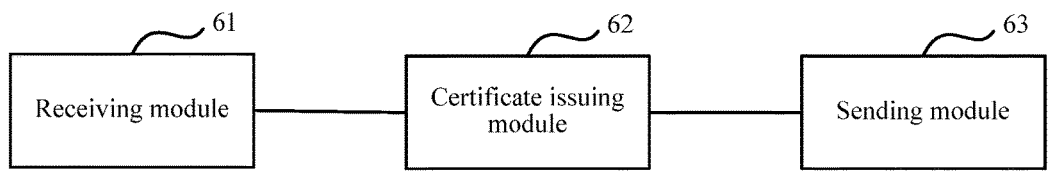
FIG. 6 is a schematic structural diagram of a certificate acquiring device according to Embodiment 7 of the present application.

As shown in FIG. 6, FIG. 6 is a schematic structural diagram of a certificate acquiring device according to Embodiment 7 of the present application. The device includes a receiving module 61, a certificate issuing module 62, and a sending module 63.

The receiving module 61 is configured to receive a certificate request message sent by a master VNFC instance, where the certificate request message includes a certificate of the master VNFC instance and a public key used by a newly installed VNFC instance to apply for a certificate.

The certificate issuing module 62 is configured to perform authentication on the certificate request message according to the certificate of the master VNFC instance that is received by the receiving module 61, and when the authentication succeeds, obtain a to-be-issued certificate by signing the public key used by the newly installed VNFC instance to apply for a certificate.

The sending module 63 is configured to send, to the master VNFC instance, the to-be-issued certificate issued by the certificate issuing module 62.

The certificate issuing module 62 is further configured to perform authentication on a signature of the certificate request message using the certificate of the master VNFC instance, and perform authentication on the received certificate of the master VNFC instance using an issued root CA certificate or an issued intermediate certificate.

Optionally, the certificate request message further includes private key POP information.

The certificate issuing module 62 is further configured to perform authentication on, using the public key that is used to apply for a certificate and that is included in the certificate request message, the POP information included in the certificate request message.

It should be noted that, the device in this embodiment of the present application may be a CA, for example, a network element device with a certificate issuing function, such as a CA, an ESA, or an RA. An implementation manner may be implemented in a hardware manner, or may be implemented in a software manner.

Embodiment 8

Figure 7:
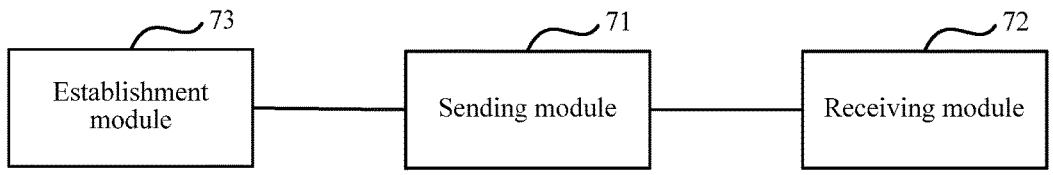
FIG. 7 is a schematic structural diagram of a certificate acquiring device according to Embodiment 8 of the present application.

As shown in FIG. 7, FIG. 7 is a schematic structural diagram of a certificate acquiring device according to Embodiment 8 of the present application. The device includes a sending module 71 and a receiving module 72.

The sending module 71 is configured to send a certificate application representation message to a master VNFC instance, where the certificate application representation message includes a public key used by a newly installed VNFC instance to apply for a certificate, the certificate application representation message is used to request the master VNFC instance to send a certificate request message to a CA, the certificate request message is used to request the CA to issue a certificate to the newly installed VNFC instance, and the certificate request message includes a certificate of the master VNFC instance and the public key used by the newly installed VNFC instance to apply for a certificate.

The receiving module 72 is configured to receive a certificate that is issued by the CA and that is sent by the master VNFC instance, where the certificate is obtained by the CA by signing the public key used by the newly installed VNFC instance to apply for a certificate.

Optionally, the receiving module 72 is further configured to receive certificate application information sent by an NFVO or a VNFM before the certificate application representation message is sent to the master VNFC, where the certificate application information includes information about the master VNFC instance used as an agent for certificate application.

Optionally, the device further includes an establishment module 73.

The establishment module 73 is configured to establish, according to the certificate application information received by the receiving module, a network connection to the master VNFC instance used as an agent for certificate application before the certificate application representation message is sent to the master VNFC, where the network connection is a network connection inside a VNF on a same NFVI platform.

The receiving module 72 is further configured to receive the certificate application information injected by a NFVI during installation.

Optionally, the information about the master VNFC used as an agent for certificate application includes an IP address, a MAC identifier, and a virtual NIC address that are of the master VNFC instance.

Optionally, the public key used by the newly installed VNFC instance to apply for a certificate is obtained in the manner of generating, by the newly installed VNFC instance, a private-public key pair, or generating, by the NFVI, a private-public key pair and injecting the private-public key pair into the newly installed VNFC instance.

Optionally, a manner for triggering the newly installed VNFC instance to send the certificate application representation message to the master VNFC instance includes triggering by means of VNF instantiation, or triggering by means of VNF scale-out.

It should be noted that, the device in this embodiment of the present application may be a newly installed VNFC instance that needs to apply for a certificate, or may be a control network element integrated on a newly installed VNFC instance that needs to apply for a certificate. An implementation manner may be implemented in a hardware manner, or may be implemented in a software manner, which is not limited herein.

Embodiment 9

Figure 8:
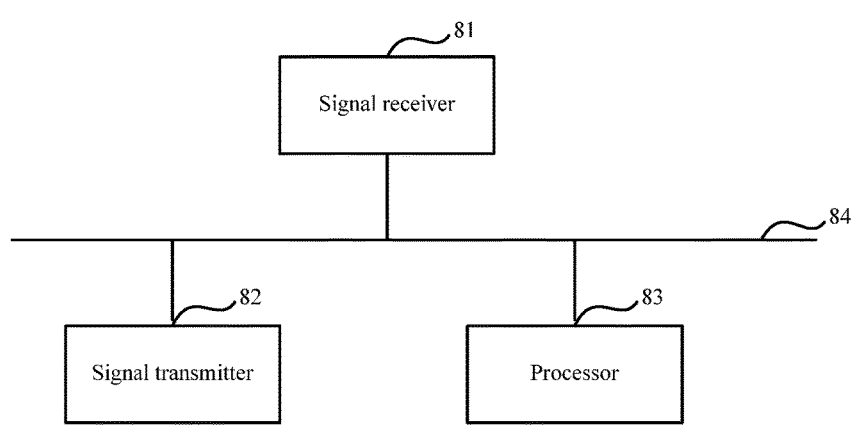
FIG. 8 is a schematic structural diagram of a certificate acquiring device according to Embodiment 9 of the present application.

As shown in FIG. 8, FIG. 8 is a schematic structural diagram of a certificate acquiring device according to Embodiment 9 of the present application. The device includes a signal receiver 81, a signal transmitter 82, and a processor 83, where the signal receiver 81, the signal transmitter 82, and the processor 83 are connected using a communications bus 84.

The signal receiver 81 is configured to receive a certificate application representation message sent by a newly installed VNFC instance, where the certificate application representation message includes a public key used by the newly installed VNFC instance to apply for a certificate.

The signal transmitter 82 is configured to send a certificate request message to a CA according to the certificate application representation message, to request the CA to issue a certificate to the newly installed VNFC instance, where the certificate request message includes a certificate of a master VNFC instance and the public key used by the newly installed VNFC instance to apply for a certificate.

The processor 83 is configured to acquire the certificate issued by the CA, where the certificate is issued by the CA using the public key used by the newly installed VNFC instance to apply for a certificate.

Optionally, the signal receiver 81 is further configured to receive a certificate response message sent by the CA before the certificate issued by the CA is acquired.

The processor 83 is further configured to perform authentication on the received certificate response message.

Further, the certificate response message includes the certificate issued by the CA.

The processor 83 is further configured to acquire the certificate that is included in the certificate response message and that is issued by the CA to the newly installed VNFC instance, where the certificate of the newly installed VNFC instance is obtained by the CA by signing, after a certificate application request message sent by the master VNFC has been authenticated according to the certificate of the master VNFC instance, the public key that is used by the newly installed VNFC instance to apply for a certificate and that is included in the certificate request message when the certificate response message has been authenticated.

Optionally, the certificate application representation message and the certificate request message further include private key POP information.

Optionally, the POP information is obtained by the newly installed VNFC instance using a private key in a private-public key pair to sign a private key POP signing key field.

Optionally, the private-public key pair used by the newly installed VNFC instance is obtained in the manner of generating, by the newly installed VNFC instance, the private-public key pair, or generating, by an NFVI, the private-public key pair and injecting the private-public key pair into the newly installed VNFC instance.

Optionally, the signal transmitter 82 is further configured to send, to the newly installed VNFC instance by means of an internal network, the acquired certificate issued by the CA to the newly installed VNFC instance after the certificate issued by the CA to the newly installed VNFC instance is acquired.

The master VNFC instance and the newly installed VNFC instance are different components of a same VNF on a same NFVI platform.

The processor 83 may be a general-purpose central processing unit (CPU), a microprocessor, an application-specific integrated circuit (ASIC), or one or more integrated circuits configured to control a program to be executed in the solution of the present application.

The communications bus 84 may include a channel, and transmit information between the foregoing components.

It should be noted that, the device in this embodiment of the present application may be another component that belongs to, together with the newly installed VNFC instance, a same VNF on a same NFVI platform, for example, a master VNFC instance. An implementation manner may be implemented in a hardware manner, or may be implemented in a software manner.

Embodiment 10

Figure 9:
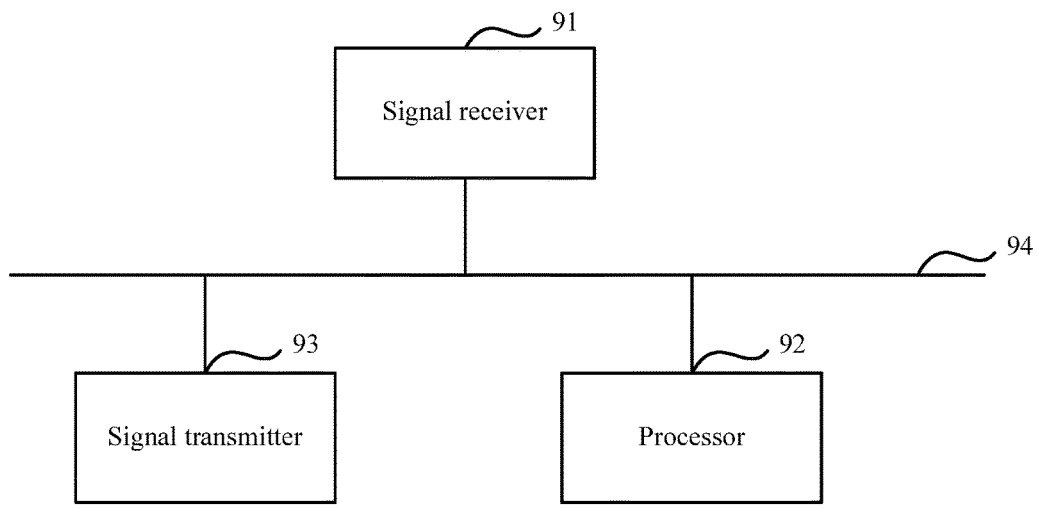
FIG. 9 is a schematic structural diagram of a certificate acquiring device according to Embodiment 10 of the present application.

As shown in FIG. 9, FIG. 9 is a schematic structural diagram of a certificate acquiring device according to Embodiment 10 of the present application. The device includes a signal receiver 91, a processor 92, and a signal transmitter 93, where the signal receiver 91, the processor 92, and the signal transmitter 93 are connected using a communications bus 94.

The signal receiver 91 is configured to receive a certificate request message sent by a master VNFC instance, where the certificate request message includes a certificate of the master VNFC instance and a public key used by a newly installed VNFC instance to apply for a certificate.

The processor 92 is configured to perform authentication on the certificate request message according to the certificate of the master VNFC instance, and obtain a to-be-issued certificate by signing the public key used by the newly installed VNFC instance to apply for a certificate when the authentication succeeds.

The signal transmitter 93 is configured to send the to-be-issued certificate to the master VNFC instance.

The processor 92 is further configured to perform authentication on a signature of the certificate request message using the certificate of the master VNFC instance, and perform authentication on the received certificate of the master VNFC instance using an issued root CA certificate or an issued intermediate certificate.

Optionally, the certificate request message further includes private key POP information.

The processor 92 is further configured to perform authentication on, by the CA, using the public key that is used to apply for a certificate and that is included in the certificate request message, the POP information included in the certificate request message.

The processor 92 may be a general-purpose CPU, a microprocessor, an ASIC, or one or more integrated circuits configured to control a program to be executed in the solution of the present application.

The communications bus 94 may include a channel, and transmit information between the foregoing components.

It should be noted that, the device in this embodiment of the present application may be a CA, for example, a network element device with a certificate issuing function, such as a CA, an ESA, or an RA. An implementation manner may be implemented in a hardware manner, or may be implemented in a software manner.

Embodiment 11

Figure 10:
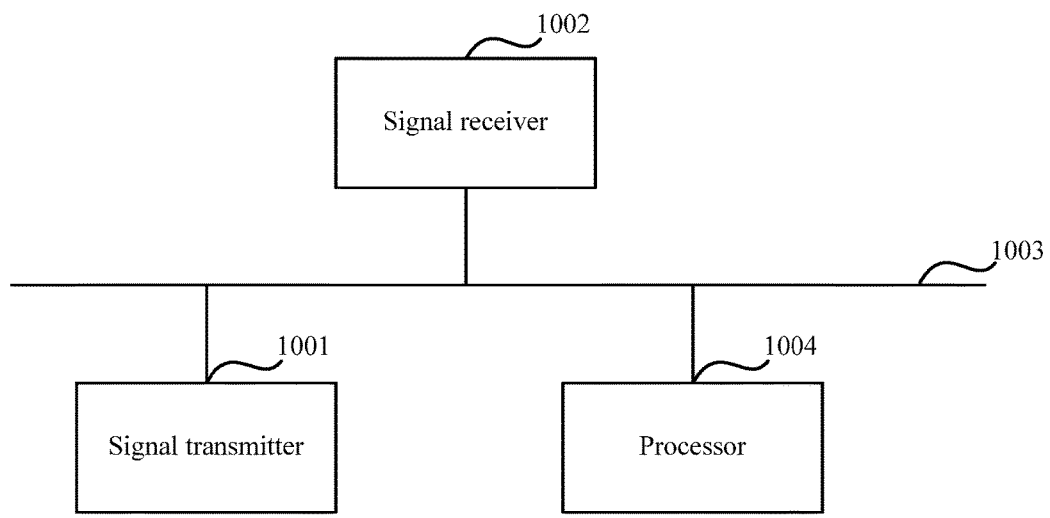
FIG. 10 is a schematic structural diagram of a certificate acquiring device according to Embodiment 11 of the present application.

As shown in FIG. 10, FIG. 10 is a schematic structural diagram of a certificate acquiring device according to Embodiment 10 of the present application. The device includes a signal transmitter 1001 and a signal receiver 1002, where the signal transmitter 1001 and the signal receiver 1002 are connected using a communications bus 1003.

The signal transmitter 1001 is configured to send a certificate application representation message to a master VNFC instance, where the certificate application representation message includes a public key used by a newly installed VNFC instance to apply for a certificate, the certificate application representation message is used to request the master VNFC instance to send a certificate request message to a CA, the certificate request message is used to request the CA to issue a certificate to the newly installed VNFC instance, and the certificate request message includes a certificate of the master VNFC instance and the public key used by the newly installed VNFC instance to apply for a certificate.

The signal receiver 1002 is configured to acquire the certificate that is issued by the CA and that is sent by the master VNFC instance, where the certificate is obtained by the CA by signing the public key used by the newly installed VNFC instance to apply for a certificate.

Optionally, the signal receiver 1002 is further configured to receive certificate application information sent by an NFVO or a VNFM before the certificate application representation message is sent to the master VNFC, where the certificate application information includes information about the master VNFC instance used as an agent for certificate application.

Optionally, the device further includes a processor 1004.

The processor 1004 is configured to establish, according to the certificate application information, a network connection to the master VNFC instance used as an agent for certificate application before the certificate application representation message is sent to the master VNFC, where the network connection is a network connection inside a VNF on a same NFVI platform.

The signal receiver 1002 is further configured to receive the certificate application information injected by a NFVI during installation.

Optionally, the information about the master VNFC used as an agent for certificate application includes an IP address, a MAC identifier, and a virtual NIC address that are of the master VNFC instance.

Optionally, the public key used by the newly installed VNFC instance to apply for a certificate is obtained in the manner of generating, by the newly installed VNFC instance, a private-public key pair, or generating, by the NFVI, a private-public key pair and injecting the private-public key pair into the newly installed VNFC instance.

Optionally, a manner for triggering the newly installed VNFC instance to send the certificate application representation message to the master VNFC instance includes triggering by means of VNF instantiation, or triggering by means of VNF scale-out.

The processor 1004 may be a general-purpose CPU, a microprocessor, an ASIC, or one or more integrated circuits configured to control a program to be executed in the solution of the present application.

The communications bus 1003 may include a channel, and transmit information between the foregoing components.

It should be noted that, the device in this embodiment of the present application may be a newly installed VNFC instance that needs to apply for a certificate, or may be a control network element integrated on a newly installed VNFC instance that needs to apply for a certificate. An implementation manner may be implemented in a hardware manner, or may be implemented in a software manner, which is not limited herein.

Persons skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer usable program code.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art may make various modifications and variations to the present application without departing from the spirit and scope of the present application. The present application is also intended to cover these modifications and variations as long as they fall within the scope of the claims of the present application and their equivalent technologies.

What is claimed is:

1. A certificate acquiring device, comprising a hardware are processor coupled with a non-transitory storage medium storing executable instructions: wherein the executable instructions, when executed by the hardware processor, cause the certificate acquiring device to:
   receive a certificate application representation message sent by a newly installed virtual network function component (VNFC) instance, wherein the certificate application representation message comprises a public key used by the newly installed VNFC instance to apply for a certificate;
   send a certificate request message to a certification authority according to the certificate application representation message, to request the certification authority to issue the certificate to the newly installed VNFC instance, wherein the certificate request message comprises a certificate of a master VNFC instance and the public key used by the newly installed VNFC instance to apply for the certificate; and
   acquire the certificate issued by the certification authority, wherein the certificate is issued by the certification authority using the public key used by the newly installed VNFC instance to apply for the certificate.

2. The device according to claim 1, wherein before acquiring the certificate, the certificate acquiring device is further configured to receive a certificate response message sent by the certification authority, and further configured to perform authentication on the received certificate response message.

3. The device according to claim 2, wherein the certificate response message comprises the certificate issued by the certification authority, and wherein the certificate acquiring device is further configured to acquire the certificate that is issued by the certification authority to the newly installed VNFC instance and that is comprised in the certificate response message, wherein the certificate of the newly installed VNFC instance is obtained by the certification authority by signing the public key that is used by the newly installed VNFC instance to apply for the certificate and that is comprised in the certificate request message after a certificate application request message sent by the master VNFC has been authenticated according to the certificate of the master VNFC instance.

4. The device according to claim 1, wherein the certificate application representation message and the certificate request message further comprise private key proof of possession (POP) information.

5. The device according to claim 4, wherein the POP information is obtained by the newly installed VNFC instance using a private key in a private-public key pair to sign a private key POP signing key field.

6. The device according to claim 5, wherein the private-public key pair used by the newly installed VNFC instance is obtained in the following manner generating, by the newly installed VNFC instance, the private-public key pair.

7. The device according to claim 1, wherein after the certificate is acquired, the certificate acquiring device is further configured to send, to the newly installed VNFC instance by means of an internal network, the acquired certificate issued by the certification authority to the newly installed VNFC instance.

8. The device according to claim 1, wherein the master VNFC instance and the newly installed VNFC instance are different components of a same virtual network function (VNF) on a same network function virtualization infrastructure (NFVI) platform.

9. A certificate acquiring device, comprising a hardware processor coupled with a non-transitory storage medium storing executable instructions: wherein the executable instructions, when executed by the hardware processor, cause the certificate acquiring device to:
receive a certificate request message sent by a master virtual network function component (VNFC) instance, wherein the certificate request message comprises a certificate of the master VNFC instance and a public key used by a newly installed VNFC instance to apply for a certificate;
perform authentication on the certificate request message according to the certificate of the master VNFC instance;
obtain a to-be-issued certificate by signing the public key used by the newly installed VNFC instance to apply for the certificate when the authentication succeeds; and
send the to-be-issued certificate to the master VNFC instance.

10. The device according to claim 9, wherein the certificate acquiring device is further configured to:
perform authentication on a signature of the certificate request message using the certificate of the master VNFC instance; and
perform authentication on the received certificate of the master VNFC instance using an issued root certification authority (CA) certificate or an issued intermediate certificate.

11. The device according to claim 9, wherein the certificate request message further comprises private key proof of possession (POP) information.

12. The device according to claim 11, wherein the certificate acquiring device is further configured to perform authentication on, by a certification authority, using the public key that is used to apply for the certificate and that is comprised in the certificate request message, the POP information comprised in the certificate request message.

13. A certificate acquiring device, comprising a hardware processor coupled with a non-transitory storage medium storing executable instructions: wherein the executable instructions, when executed by the hardware processor, cause the certificate acquiring device to:
send a certificate application representation message to a master virtualized network function component (VNFC) instance, wherein the certificate application representation message comprises a public key used by a newly installed VNFC instance to apply for a certificate, wherein the certificate application representation message is used to request the master VNFC instance to send a certificate request message to a certification authority, wherein the certificate request message is used to request the certification authority to issue the certificate to the newly installed VNFC instance, and wherein the certificate request message comprises a certificate of the master VNFC instance and the public key used by the newly installed VNFC instance to apply for the certificate; and
receive the certificate that is issued by the certification authority and that is sent by the master VNFC instance, wherein the certificate is obtained by the certification authority by signing the public key used by the newly installed VNFC instance to apply for the certificate.

14. The device according to claim 13, wherein before the certificate application representation message is sent to the master VNFC, the certificate acquiring device is further configured to receive certificate application information sent by a network function virtualization orchestrator (NFVO) or a virtualized network function manager (VNFM), wherein the certificate application information comprises information about the master VNFC instance used as an agent for certificate application.

15. The device according to claim 14, wherein before the certificate application representation message is sent to the master VNFC, the certificate acquiring device is configured to establish, according to the certificate application information, a network connection to the master VNFC instance used as the agent for certificate application, wherein the network connection is a network connection inside a virtualized network function (VNF) on a same network function virtualization infrastructure (NFVI) platform.

16. The device according to claim 14, wherein during installation, the certificate acquiring device is further configured to receive the certificate application information injected by a network function virtualization infrastructure (NFVI).

17. The device according to claim 14, wherein the information about the master VNFC used as the agent for the certificate application comprises an Internet protocol (IP)

address, a Media Access Control (MAC) identifier, and a virtual network information center (NIC) address that are of the master VNFC instance.

18. The device according to claim 13, wherein the public key used by the newly installed VNFC instance to apply for the certificate is obtained in the following manner generating, by the newly installed VNFC instance, a private-public key pair.

19. The device according to claim 13, wherein a manner for triggering the newly installed VNFC instance to send the certificate application representation message to the master VNFC instance comprises triggering by means of virtualized network function (VNF) instantiation.

20. The device according to claim 13, wherein a manner for triggering the newly installed VNFC instance to send the certificate application representation message to the master VNFC instance comprises triggering by means of virtualized network function (VNF) scale-out.

* * * * *

UNITED STATES PATENT AND TRADEMARK OFFICE
CERTIFICATE OF CORRECTION

PATENT NO. : 10,367,647 B2  
APPLICATION NO. : 15/345829  
DATED : July 30, 2019  
INVENTOR(S) : Chengyan Feng and Jiangsheng Wang Page 1 of 1

It is certified that error appears in the above-identified patent and that said Letters Patent is hereby corrected as shown below:

Claim 1, Column 34, Line 48 should read:
"processor coupled with a non-transitory storage medium"

Signed and Sealed this
Twenty-eighth Day of January, 2020

Andrei Iancu
*Director of the United States Patent and Trademark Office*